(12) United States Patent
Hatanaka

(10) Patent No.: US 8,675,111 B2
(45) Date of Patent: *Mar. 18, 2014

(54) INFORMATION PROCESSING APPARATUS AND METHOD

(75) Inventor: Koji Hatanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

This patent is subject to a terminal disclaimer.

(21) Appl. No.: 13/558,744

(22) Filed: Jul. 26, 2012

(65) Prior Publication Data

US 2012/0287292 A1 Nov. 15, 2012

Related U.S. Application Data

(63) Continuation of application No. 12/350,664, filed on Jan. 8, 2009, now Pat. No. 8,253,807.

(30) Foreign Application Priority Data

Jan. 22, 2008 (JP) ................................ 2008-011931

(51) Int. Cl.
*H04N 5/225* (2006.01)
*H04N 5/222* (2006.01)
*H04N 9/04* (2006.01)

(52) U.S. Cl.
USPC ................................ 348/333.01; 348/207.99

(58) Field of Classification Search
USPC ................ 348/207.1–207.11, 333.01–333.13
See application file for complete search history.

(56) References Cited

U.S. PATENT DOCUMENTS

| | | | | |
|---|---|---|---|---|
| 6,774,935 | B1 * | 8/2004 | Morimoto et al. | 348/211.5 |
| 6,819,355 | B1 * | 11/2004 | Niikawa | 348/207.11 |
| 7,161,618 | B1 * | 1/2007 | Niikawa et al. | 348/207.1 |
| 7,605,849 | B1 * | 10/2009 | Hatanaka | 348/231.2 |
| 2002/0054224 | A1 * | 5/2002 | Wasula et al. | 348/232 |
| 2002/0191079 | A1 * | 12/2002 | Kobayashi et al. | 348/207.1 |
| 2005/0057658 | A1 * | 3/2005 | Ohmura et al. | 348/207.99 |
| 2005/0134689 | A1 * | 6/2005 | Hatanaka | 348/207.1 |
| 2005/0213147 | A1 * | 9/2005 | Minatogawa | 358/1.15 |

* cited by examiner

*Primary Examiner* — Roberto Velez
*Assistant Examiner* — Tuan Le
(74) *Attorney, Agent, or Firm* — Cowan, Liebowitz & Latman, P.C.

(57) ABSTRACT

An information processing apparatus includes a first obtaining unit, a second obtaining unit and a display control unit. The first obtaining unit obtains, from an electronic device connected to the information processing apparatus, image data stored in a memory medium connected to the electronic device. The second obtaining unit obtains in advance reduced image data corresponding to the image data before obtainment of the image data by the first obtaining unit. The display control unit updates reduced image data displayed on a display unit, obtained by the second obtaining unit, in accordance with a display condition designated by a user. When the display condition is changed while the first obtaining unit is executing obtainment of image data, the first obtaining unit changes an obtainment order of image data based on the changed display condition.

12 Claims, 24 Drawing Sheets

FIG. 14

| Camera File | Time | Archive | Filter | Priority | Local Path |
|---|---|---|---|---|---|
| IMG_0002.JPG | 2008/1/2 14:00 | no | | | |
| IMG_0003.JPG | 2008/1/3 15:00 | no | | | |
| IMG_0004.AVI | 2008/1/4 16:00 | no | | | |
| IMG_0005.JPG | 2008/1/5 16:30 | no | | | |

FIG. 24

| Camera File | Time | Archive | Filter | Priority | Local Path |
|---|---|---|---|---|---|
| IMG_0002.JPG | 2008/1/2 14:00 | no | yes | | |
| IMG_0003.JPG | 2008/1/3 15:00 | no | yes | | |
| IMG_0004.AVI | 2008/1/4 16:00 | no | no | | |
| IMG_0005.JPG | 2008/1/5 16:30 | no | yes | | |

| Camera File | Time | Archive | Filter | Priority | Local Path |
|---|---|---|---|---|---|
| IMG_0002.JPG | 2008/1/2 14:00 | no | yes | 1 | |
| IMG_0003.JPG | 2008/1/3 15:00 | no | yes | 2 | |
| IMG_0004.AVI | 2008/1/4 16:00 | no | no | 4 | |
| IMG_0005.JPG | 2008/1/5 16:30 | no | yes | 3 | |

1400 · 1401 Camera File · 1402 Time · 1403 Archive · 1404 Filter · 1405 Priority · 1406 Local Path

F I G. 26

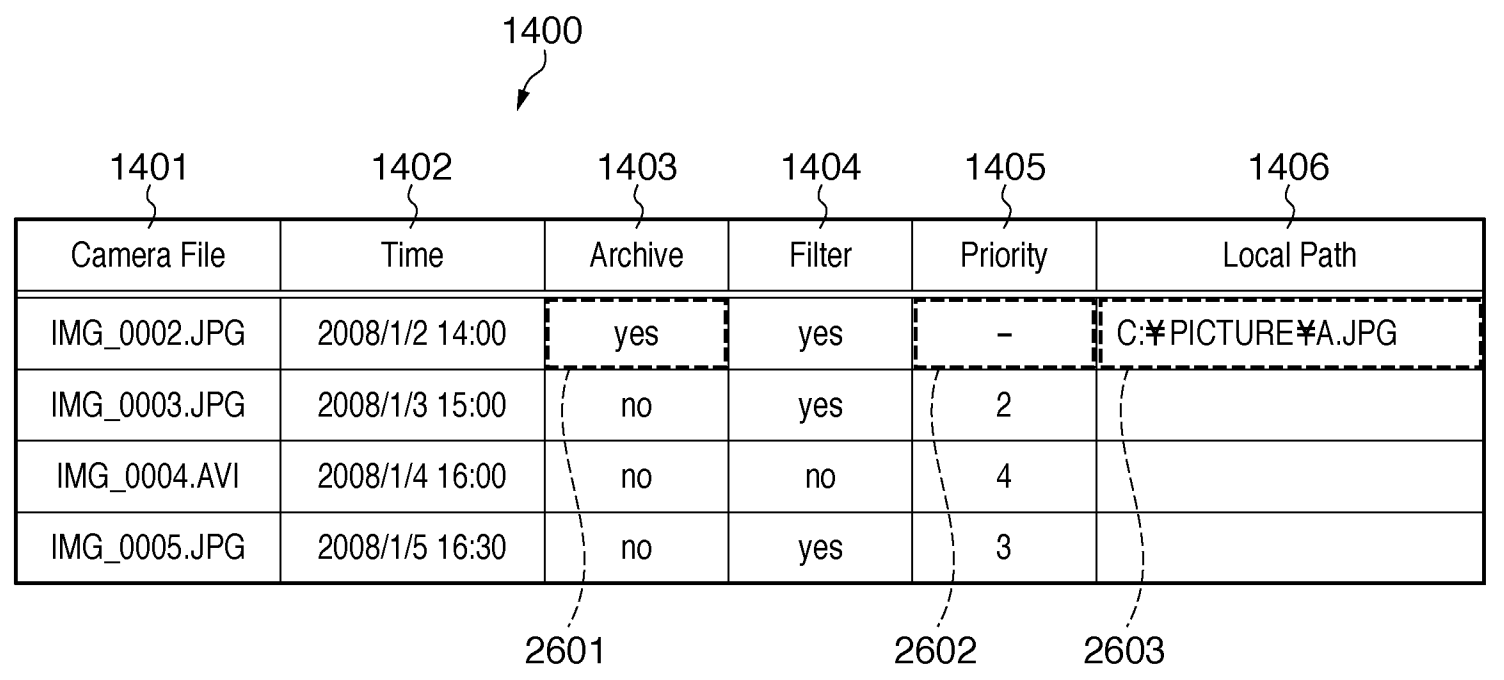

| Camera File | Time | Archive | Filter | Priority | Local Path |
|---|---|---|---|---|---|
| IMG_0002.JPG | 2008/1/2 14:00 | yes | yes | – | C:¥PICTURE¥A.JPG |
| IMG_0003.JPG | 2008/1/3 15:00 | no | yes | 2 | |
| IMG_0004.AVI | 2008/1/4 16:00 | no | no | 4 | |
| IMG_0005.JPG | 2008/1/5 16:30 | no | yes | 3 | |

F I G. 27
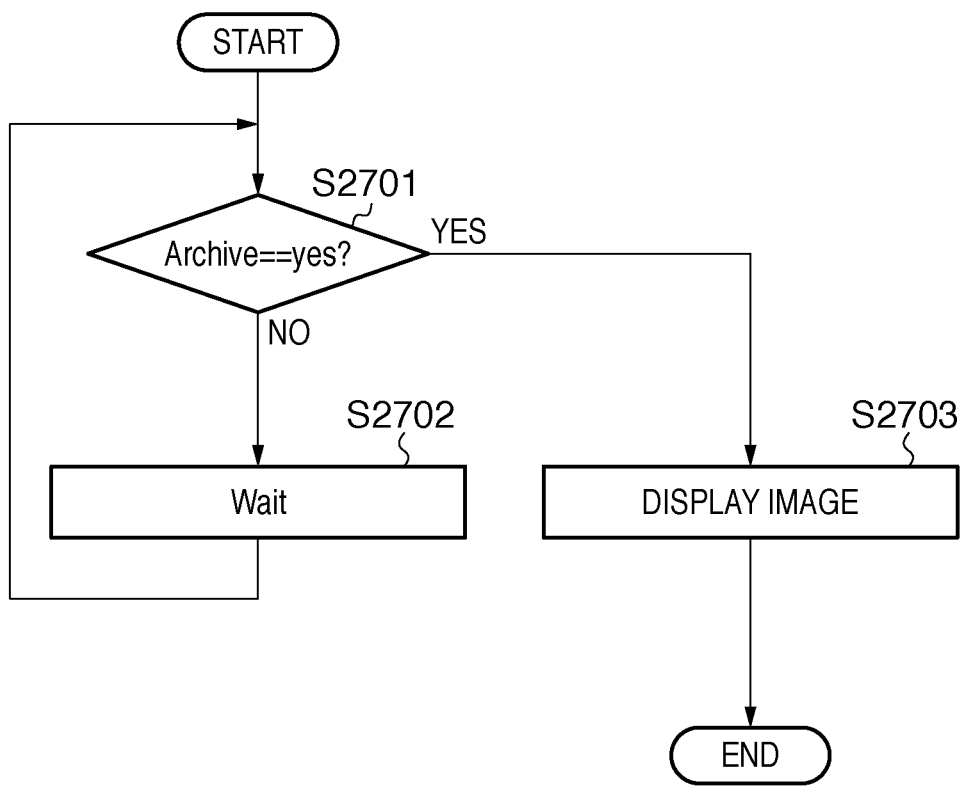

INFORMATION PROCESSING APPARATUS AND METHOD

CROSS-REFERENCE TO RELATED APPLICATIONS

This application is a continuation of application Ser. No. 12/350,664, filed Jan. 8, 2009 the entire disclosure of which is hereby incorporated by reference.

BACKGROUND OF THE INVENTION

1. Field of the Invention

The present invention relates to an information processing apparatus and method, which control an electronic device such as a digital camera or the like to transmit data, and store the transmitted data.

2. Description of the Related Art

A system in which an electronic device such as a digital camera having a storage device and an information processing apparatus (host apparatus) such as a computer or the like are connected, and an application which runs on the host apparatus exchanges information such as image data between these apparatuses is known. In the system of this type, image data stored in an auxiliary storage device (for example, a memory card) equipped in the electronic device are transferred to the host apparatus, and are backed up in an auxiliary storage device (for example, a hard disk) of the host apparatus (see Japanese Patent Laid-Open No. 2003-283901). In recent years, a system which analyzes image data stored in the auxiliary storage device of the digital camera, automatically determines those which are not backed up to the host apparatus, and automatically transfers only these data to be backed up to the host apparatus has been proposed.

However, with increased number of pixels of a digital camera, and along with the popularization of a movie capturing function, the data size of image data itself tends to increase, and a time period required to back up data tends to increase accordingly. On the other hand, the user often wants to browse images stored in a digital camera on a large screen of the host apparatus immediately after the digital camera is connected to the host apparatus.

However, in the conventional system, the user cannot browse obtained image data on the host apparatus before the backup processing of all image data is completed. Or the host apparatus executes backup processing of image data in a predetermined order, and the user can only browse image data on the host apparatus in turn from those which have already been backed up. For this reason, when the user wants to browse image data which have a later backup order, he or she can only browse them (1) after the backup processing of all data is completed, or (2) after the backup processing of all image data in an earlier reception order upon backup is completed. Therefore, a long waiting time period is produced in some cases until desired image data is displayed on the host apparatus during the backup operation.

SUMMARY OF THE INVENTION

According to one aspect of the present invention, there is provided an information processing apparatus comprising: a first obtaining unit which obtains, from an electronic device connected to the information processing apparatus, image data stored in a memory medium connected to the electronic device; a second obtaining unit which obtains in advance reduced image data corresponding to the image data before obtainment of the image data by the first obtaining unit; and a display control unit which updates reduced image data displayed on a display unit, obtained by the second obtaining unit, in accordance with a display condition designated by a user, wherein, when the display condition is changed while the first obtaining unit is executing obtainment of image data, the first obtaining unit changes an obtainment order of image data based on the changed display condition.

According to another aspect of the present invention, there is provided an information processing method by an information processing apparatus, comprising: a first obtaining step of obtaining, from an electronic device connected to the information processing apparatus, image data stored in a memory medium connected to the electronic device; a second obtaining step of obtaining in advance reduced image data corresponding to the image data before obtainment of the image data in the first obtaining step; and a display control step of updating reduced image data displayed on a display unit, obtained in the second obtaining step, in accordance with a display condition designated by a user, wherein, when the display condition is changed while obtainment of image data is executing in the first obtaining step, the first obtaining step changes an obtainment order of image data based on the changed display condition.

Further features of the present invention will become apparent from the following description of exemplary embodiments with reference to the attached drawings.

BRIEF DESCRIPTION OF THE DRAWINGS

FIG. 14 is a table showing an example of the data configuration of a file obtainment management list according to the embodiment;

FIG. 24 is a table showing an example of the file obtainment management list according to the embodiment of the present invention;

FIG. 25 is a table showing an example of the file obtainment management list according to the embodiment of the present invention;

FIG. 26 is a table showing an example of the file obtainment management list according to the embodiment of the present invention; and FIG. 27 is a flowchart for explaining the operation of the application according to the embodiment of the present invention, that is, processing for displaying a main image on a main image display area.

DESCRIPTION OF THE EMBODIMENTS

Preferred embodiments of the present invention will be described hereinafter with reference to the accompanying drawings.

A digital camera will be exemplified below as an electronic device having an auxiliary storage unit that records data. An information processing apparatus which can be configured by a personal computer or the like will be exemplified as a host apparatus which can connect such electronic device.

Figure 1:
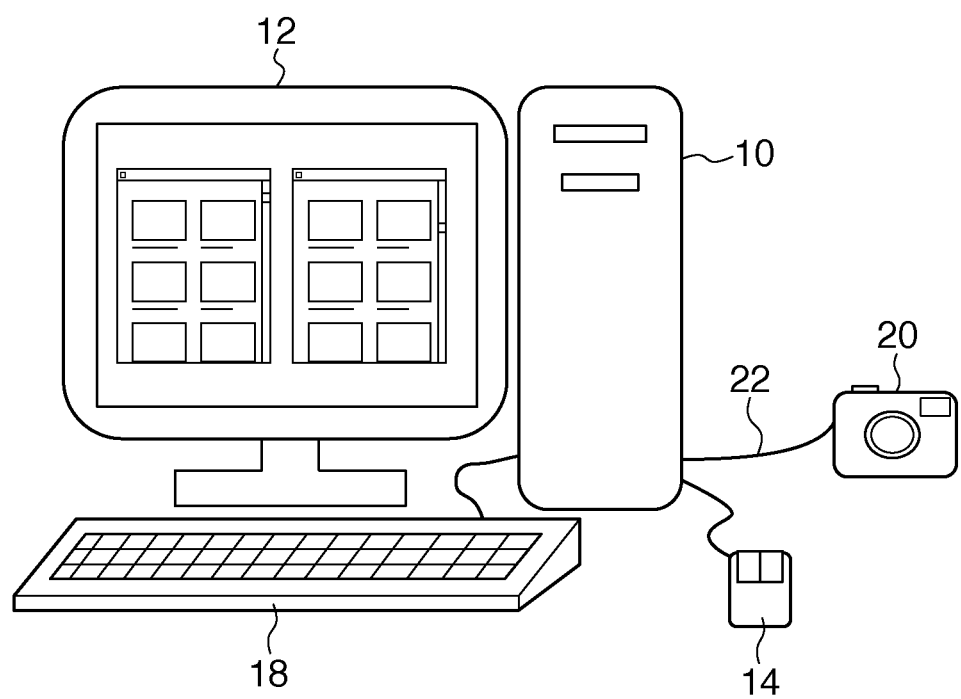
FIG. 1 is a schematic view showing an example of the arrangement of an information processing system according to an embodiment.

FIG. 1 is a schematic view showing an example of the arrangement of an information processing system according to this embodiment. Referring to FIG. 1, reference numeral 10 denotes a computer which serves as a host apparatus. The computer 10 configures an information processing apparatus which can connect an electronic device. Reference numeral 12 denotes a monitor which displays an output of the computer 10 as an image. Reference numeral 14 denotes a pointing device; and 18, a keyboard. The pointing device 14 and keyboard 18 are connected to the computer 10 to configure an operation unit of the information processing apparatus. As the pointing device 14, for example, a mouse can be used. Reference numeral 20 denotes a digital camera as an electronic device according to this embodiment, which is connected to the computer 10 via a USB cable 22.

Figure 2:
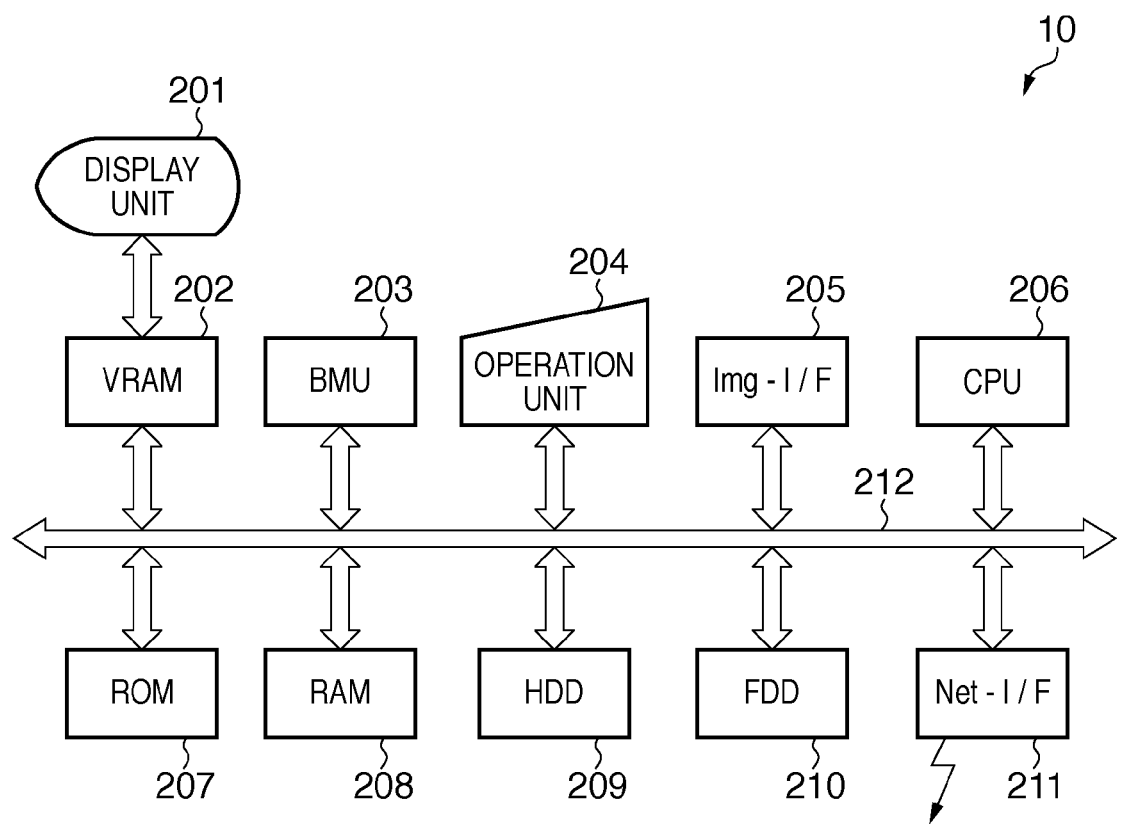
FIG. 2 is a block diagram showing an example of the arrangement of an information processing apparatus according to the embodiment.

FIG. 2 is a block diagram showing an example of the arrangement of the information processing apparatus according to this embodiment.

Referring to FIG. 2, reference numeral 201 denotes a display unit, which includes the monitor 12 and a part of a video interface 308 to be described later with reference to FIG. 3. The display screen of the monitor 12 displays edit information of documents, graphics, images, and the like, which are being edited, and user interface information such as icons, messages, and menus. Reference numeral 202 denotes a VRAM on which a rendering management system 313 (FIG. 3) renders an image to be displayed on the display screen of the display unit 201. Image data generated on this VRAM 202 is transmitted to the display unit 201, thereby displaying the image data on the monitor 12. Note that the VRAM 202 configures a part of the video interface 308.

Reference numeral 203 denotes a bit move unit (BMU), which controls data transmission between memories (e.g., the VRAM 202 and other memories) and that between memories and respective I/O devices.

Reference numeral 204 denotes an operation unit which accepts user's operations from the keyboard 18 and pointing device 14.

Reference numeral 205 denotes an image input interface, which controls inputs of image data from a digital still camera, digital video, scanner, or the like. The image input interface 205 comprises, for example, a USB interface, and can, for example, receive image data from the digital camera 20.

Reference numeral 206 denotes a CPU. The CPU 206 executes communication control and display control of respective devices connected to itself based on control programs stored in a ROM 207 and HDD 209 or flexible disk. Reference numeral 207 denotes a ROM which holds various control programs and data. Reference numeral 208 denotes a RAM which has a work area of the CPU 206, a data save area at the time of error processing, a load area of control programs, and the like.

Reference numeral 209 denotes a hard disk drive (to be abbreviated as "HDD" hereinafter), which can store respective control programs to be executed by the CPU 206, and various contents. Reference numeral 210 denotes a flexible disk drive (FDD), which controls access to a flexible disk as a detachable recording medium. Note that the detachable recording medium is not limited to the flexible disk, and optical disk media such as a Compact Disk (CD), and Digital Versatile Disk (DVD) may be used. Alternatively, a device that allows access to external storage devices such as card type media (e.g., an IC card and memory card) may be used.

Reference numeral 211 denotes a network interface, which can communicate with another external apparatus via the Internet. Reference numeral 212 denotes a CPU bus, which includes an address bus, data bus, and control bus. Control programs can be provided, to the CPU 206, from the ROM 207, HDD 209, and FDD 210 or from another information processing apparatus or the like via the network interface 211 and Internet.

Figure 3:
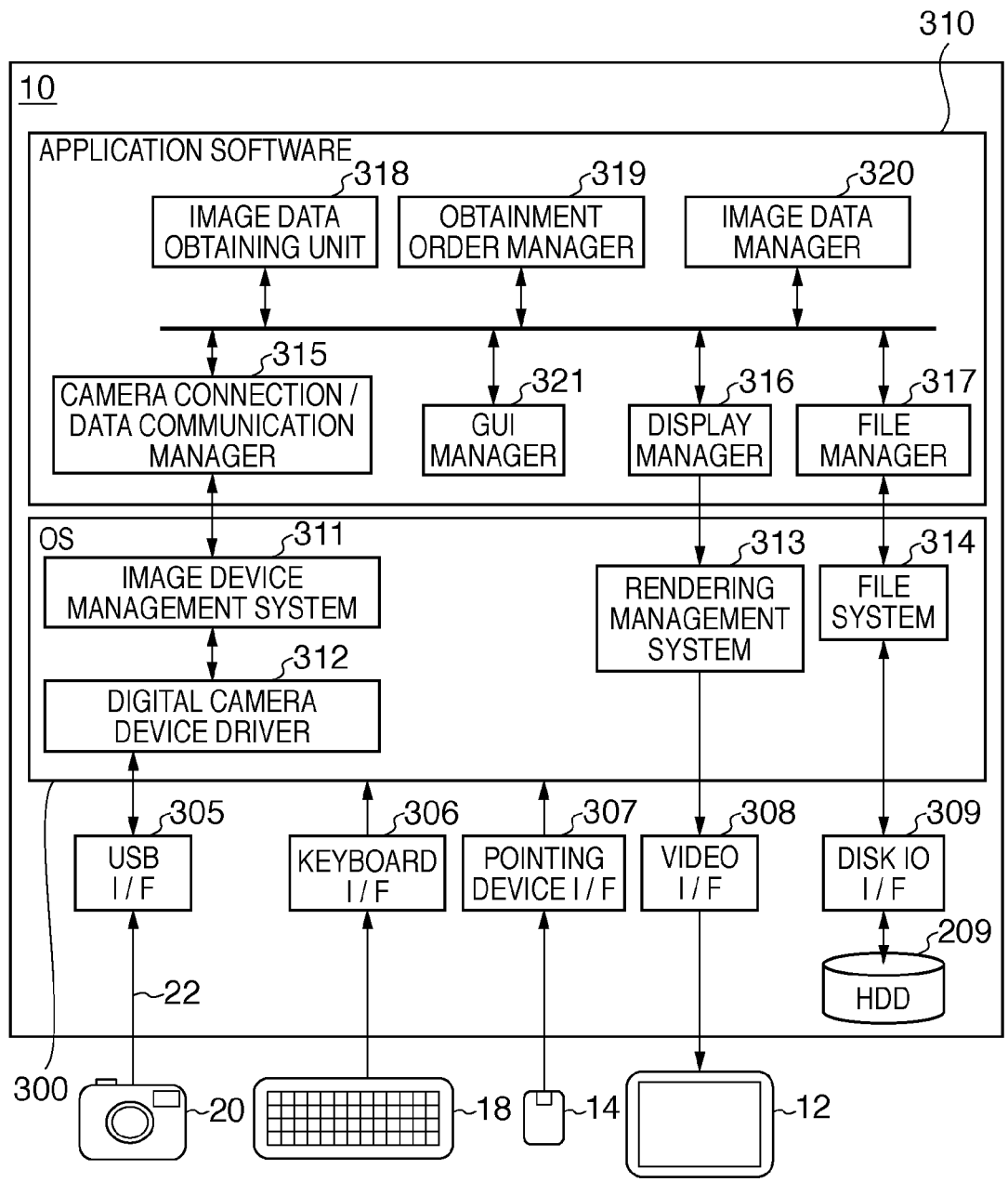
FIG. 3 is a block diagram showing an example of the functional arrangement of the information processing apparatus according to the embodiment.

FIG. 3 is a block diagram showing an example of the functional arrangement of the computer 10 according to this embodiment. On the computer 10, an operating system (OS) 300 runs, as is well known, and application software 310 is located to operate on the OS 300. Elements which are not directly required upon understanding the arrangement of this embodiment, for example, a CPU and a memory management system of the OS are not shown in FIG. 3.

Reference numeral 314 denotes a file system, which is included in the OS 300, and provides a function that allows the application software 310 to input and output files without directly controlling hardware. Note that such file system is known to those who are skilled in the art. A disk input/output interface 309 is an interface used when the file system 314 reads or writes data from or in the HDD 209.

Reference numeral 313 denotes a rendering management system, which is included in the OS 300, and provides a function that allows the application software 310 to generate an image without directly controlling hardware. Reference numeral 308 denotes a video interface, which converts image data generated by the rendering management system 313 into a video signal compatible with the monitor 12.

Reference numeral 311 denotes an image device management system, which is included in the OS 300, and manages devices that handle image data such as the digital camera 20 and a scanner (not shown). The image device management system 311 automatically allots an appropriate device driver to a connected device, and provides a function that allows the application software 310 to manage inputs and outputs from the device without directly controlling the device. The image device management system 311 can activate the application software 310 in response to a request from the connected device.

Reference numeral 306 denotes a keyboard interface that connects the keyboard 18; 307, a pointing device interface that connects the pointing device 14; and 305, a USB interface. The keyboard interface 306, pointing device interface 307, keyboard 18, and pointing device 14 configure the operation unit 204 in FIG. 2.

The digital camera 20 is connected to the USB interface 305 via the USB cable 22. The digital camera 20 connected to the USB interface 305 can communicate with the application software 310 for a digital camera via a digital camera device driver 312 and the image device management system 311. The digital camera 20 and application software 310 exchange control commands, status signals, image data, and the like.

The application software 310 is used to obtain, back up, and display image data from the digital camera 20, and to control the digital camera 20. In the application software 310, a camera connection/data communication manager 315 communicates with the digital camera 20 by accessing the image device management system 311 of the OS 300. An image data obtaining unit 318 obtains image data captured by the digital camera 20 using the camera connection/data communication manager 315. An obtainment order manager 319 manages an obtainment order upon obtaining image data by the image data obtaining unit 318. An image data manager 320 manages image data obtained from the digital camera 20, and those saved in the HDD 209. A display manager 316 displays image data obtained from the digital camera 20, and image files saved in the HDD 209 on the screen of the monitor 12. A file manager 317 stores image data obtained from the digital camera 20 in the HDD 209 and manages them. A GUI manager 321 manages a graphical user interface (GUI) displayed on the monitor 12. Note that elements which are not directly required to understand the arrangement of this embodiment are not shown in FIG. 3.

Figure 4:
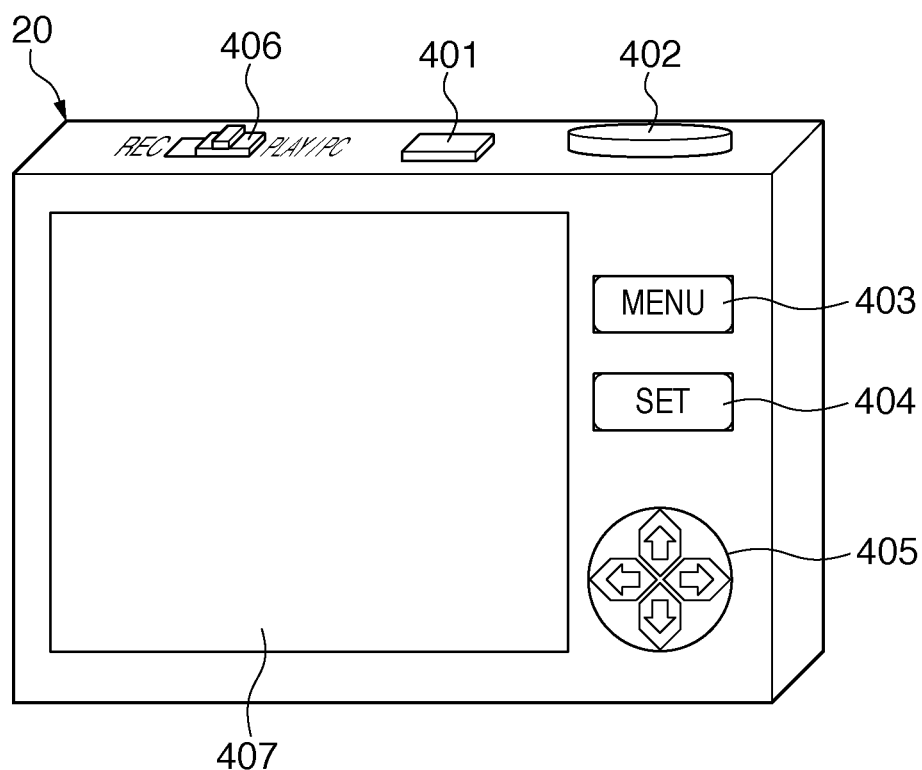
FIG. 4 is a view showing the outer appearance of a digital camera 20 according to the embodiment.

The arrangement of the digital camera 20 according to this embodiment will be described below. FIG. 4 is a view showing the outer appearance of the digital camera 20 according to this embodiment.

A liquid crystal screen 407 can display various menus used to designate settings of the digital camera. The liquid crystal screen 407 serves as a viewfinder upon imaging, and is used to, for example, play back and display captured images stored in a memory card.

A power button 401 is used to turn on or off the power supply of the digital camera 20. An imaging (REC)/playback selection switch 406 is used to switch between an imaging mode and playback mode of the digital camera. A shutter button 402 is used to capture an image.

A menu button 403 is used when a menu screen that allows the user to set or designate operations of the camera upon imaging or playback is displayed on the liquid crystal screen 407. Upon pressing of the menu button 403, various menus including a plurality of menu items are displayed on the liquid crystal screen 407. As will be described in detail later, a menu upon connection to the computer is displayed in response to a command from the computer in some cases (camera operation mode). A set button 404 and arrow button 405 are used upon operating a menu displayed on the liquid crystal screen 407. For example, a cursor in the menu is moved using an up or down button of the arrow button 405, and a menu item is selected by the set button 404. When selection is settled, that menu item is bounded by a bold frame to allow the user to confirm the selected state.

Figure 5:
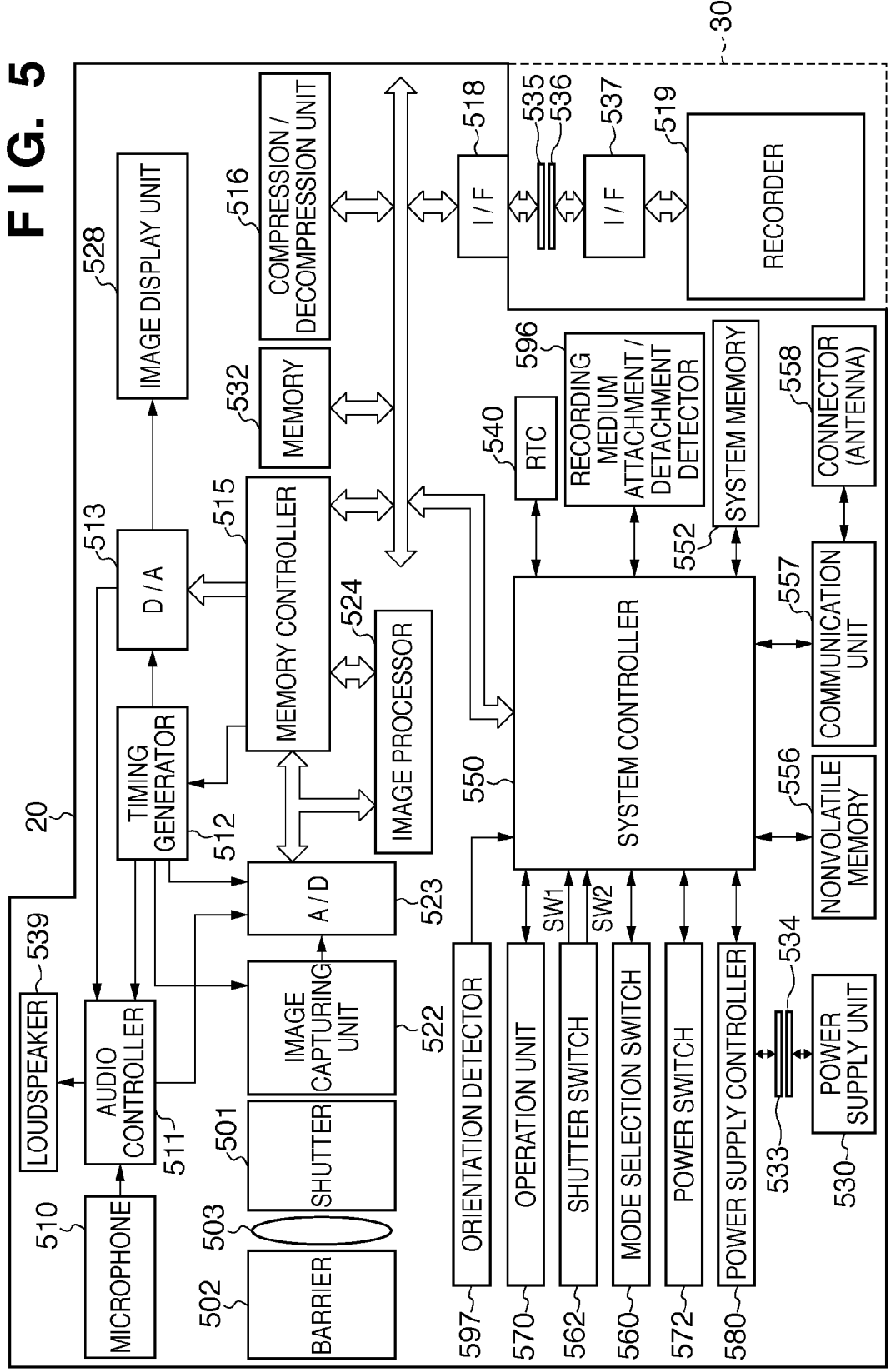
FIG. 5 is a block diagram showing an example of the arrangement of the digital camera 20 according to the embodiment.

FIG. 5 is a block diagram showing an example of the arrangement of the digital camera 20 as an image capturing device according to this embodiment. Referring to FIG. 5, reference numeral 503 denotes an imaging lens; 501, a shutter having an aperture function; and 522, an image capturing unit comprising a CCD, CMOS element, or the like, which converts an optical image into an electrical signal. Reference numeral 523 denotes an A/D converter which converts an analog signal into a digital signal. The A/D converter 523 is used when an analog signal output from the image capturing unit 522 is converted into a digital signal and when an analog signal output from an audio controller 511 is converted into a digital signal. Reference numeral 502 denotes a barrier, which covers the image capturing unit including the lens 503 of the digital camera 20 to prevent an image capturing system including the lens 503, shutter 501, and image capturing unit 522 from being contaminated or damaged.

Reference numeral 512 denotes a timing generator, which supplies clock signals and control signals to the image capturing unit 522, the audio controller 511, the A/D converter 523, and a D/A converter 513. The timing generator 512 is controlled by a memory controller 515 and system controller 550. Reference numeral 524 denotes an image processor, which applies resize processing such as predetermined interpolation and reduction, and color conversion processing to data from the A/D converter 523 or that from the memory controller 515. The image processor 524 executes predetermined arithmetic processing using the captured image data, and the system controller 550 executes exposure control and ranging control based on the obtained arithmetic result. As a result, TTL (through-the-lens) AF (auto focus) processing, AE (auto exposure) processing, and EF (flash pre-emission) processing are executed. The image processor 524 further executes predetermined arithmetic processing using the captured image data, and also executes TTL AWB (auto white balance) processing based on the obtained arithmetic result.

Output data from the A/D converter 523 is written in a memory 532 via the image processor 524 and memory controller 515 or directly via the memory controller 515. The memory 532 stores image data which is captured by the image capturing unit 522 and is converted into digital data by the A/D converter 523, and image data to be displayed on an image display unit 528. The image display unit 528 has the aforementioned liquid crystal screen 407. Note that the memory 532 is also used to store audio data recorded via a microphone 510, still images, movies, and file headers upon forming image files. Therefore, the memory 532 has a storage capacity large enough to store a predetermined number of still image data, and movie data and audio data for a predetermined period of time.

A compression/decompression unit 516 compresses or decompresses image data by adaptive discrete cosine transform (ADCT) or the like. The compression/decompression unit 516 loads captured image data stored in the memory 532 in response to pressing of the shutter 501 as a trigger, executes the compression processing, and writes the processed data in the memory 532. Also, the compression/decompression unit 516 applies decompression processing to compressed image data loaded from a recorder 519 for a recording medium 30 or the like onto the memory 532, and writes the processed data in the memory 532. Image data written in the memory 532 by the compression/decompression unit 516 is converted into a file by the system controller 550, and that file is recorded in the recording medium 30 via an interface 518. The memory 532 also serves as an image display memory (video memory). Reference numeral 513 denotes a D/A converter, which converts image display data stored in the memory 532 into an analog signal, and supplies that analog signal to the image display unit 528. Reference numeral 528 denotes an image display unit, which makes display according to the analog signal from the D/A converter 513 on the liquid crystal screen 407 of an LCD display. In this manner, image data to be displayed written in the memory 532 is displayed by the image display unit 528 via the D/A converter 513.

Reference numeral 510 denotes a microphone. An audio signal output from the microphone 510 is supplied to the A/D converter 523 via the audio controller 511 which includes an amplifier and the like, is converted into a digital signal by the A/D converter 523, and is then stored in the memory 532 by the memory controller 515. On the other hand, audio data recorded in the recording medium 30 is loaded onto the memory 532, and is converted into an analog signal by the D/A converter 513. The audio controller 511 drives a loudspeaker 539 according to this analog signal, thus outputting a sound.

A nonvolatile memory 556 is an electrically erasable and recordable memory, and uses, for example, an EEPROM. The nonvolatile memory 556 stores constants, programs, and the like required to operate the system controller 550. Note that the programs include those required to execute various flowcharts to be described later in this embodiment.

Reference numeral 550 denotes a system controller, which controls the entire digital camera 20. The system controller 550 executes programs recorded in the aforementioned nonvolatile memory 556 to implement respective processes to be described later of this embodiment. Reference numeral 552 denotes a system memory which comprises a RAM. On the system memory 552, constants and variables required to operate system controller 550, programs read out from the nonvolatile memory 556, and the like are mapped.

A mode selection switch 560, shutter switch 562, and operation unit 570 form operation means used to input various operation instructions to the system controller 550.

The mode selection switch 560 includes the imaging/playback selection switch 406, and is used to switch the operation mode of the system controller 550 to one of a still image recording mode, movie recording mode, playback mode, and the like. The shutter switch 562 is turned on in the middle of operation (half stroke) of the shutter button 402 arranged on the digital camera 20, and generates a first shutter switch signal SW1. Also, the shutter switch 562 is turned on upon completion of operation (full stroke) of the shutter button 402, and generates a second shutter switch signal SW2. The system controller 550 starts the operations of the AF (auto focus) processing, AE (auto exposure) processing, AWB (auto white balance) processing, EF (flash pre-emission) processing, and the like in response to the first shutter switch signal SW1. Also, the system controller 550 starts a series of imaging processes from when a signal is read from the image capturing unit 522 until image data is written in the recording medium 30 in response to the second shutter switch signal SW2.

Respective operation members of the operation unit 570 are assigned appropriate functions depending on scenes by selecting various function icons displayed on the image display unit 528, and serve as various function buttons. The function buttons include, for example, an end button, back button, image feed button, jump button, filtering button, and attribute change button. For example, upon pressing of a menu button, a menu screen that allows making various settings is displayed on the image display unit 528. The user can intuitively make various settings using the menu screen displayed on the image display unit 528, arrow button 405, and set button 404. A power switch 572 corresponds to the power button 401, and is used to switch between power-ON and power-OFF.

Reference numeral 580 denotes a power supply controller, which includes a battery detection circuit, DC-DC converter, switch circuit used to switch blocks to be energized, and the like, and detects the presence/absence of attachment of a battery, the type of battery, and the battery remaining amount. The power supply controller 580 controls the DC-DC converter based on its detection result and an instruction from the system controller 550, and supplies required voltages to respective units including the recording medium 30 for required periods.

Reference numeral 530 denotes a power supply unit which includes a primary battery such as an alkaline battery or lithium battery, a secondary battery such as an NiCd battery, NiMH battery, or Li battery, or an AC adapter. Reference numerals 533 and 534 denote connectors used to connect the power supply unit 530 and power supply controller 580.

Reference numeral 540 denotes an RTC (Real Time Clock) which measures a date and time. The RTC 540 holds an internal power supply unit independently of the power supply controller 580, and continues time measurement even when the power supply unit 530 is OFF. The system controller 550 sets a system timer using a date and time obtained from the RTC 540 at the time of activation, and executes timer control.

Reference numeral 518 denotes an interface with the recording medium 30 such as a memory card or hard disk. Reference numeral 535 denotes a connector used to connect the recording medium 30 and interface 518. Reference numeral 596 denotes a recording medium attachment/detachment detector, which detects whether or not the recording medium 30 is attached to the connector 535.

Reference numeral 597 denotes an orientation detector, which detects the orientation of the image capturing unit 522.

Reference numeral 30 denotes a recording medium such as a memory card or hard disk. The recording medium 30 comprises the recorder 519 including a semiconductor memory, magnetic disk, or the like, an interface 537 with the digital camera 20, and a connector 536 used to connect the recording medium 30 and digital camera 20.

A communication unit 557 executes various kinds of communication processing such as RS232C, USB, IEEE1394, P1284, SCSI, a modem, LAN, and wireless communication.

A connector (antenna in case of a wireless communication) 558 connects the digital camera 20 with another device via the communication unit 557.

Figure 6:
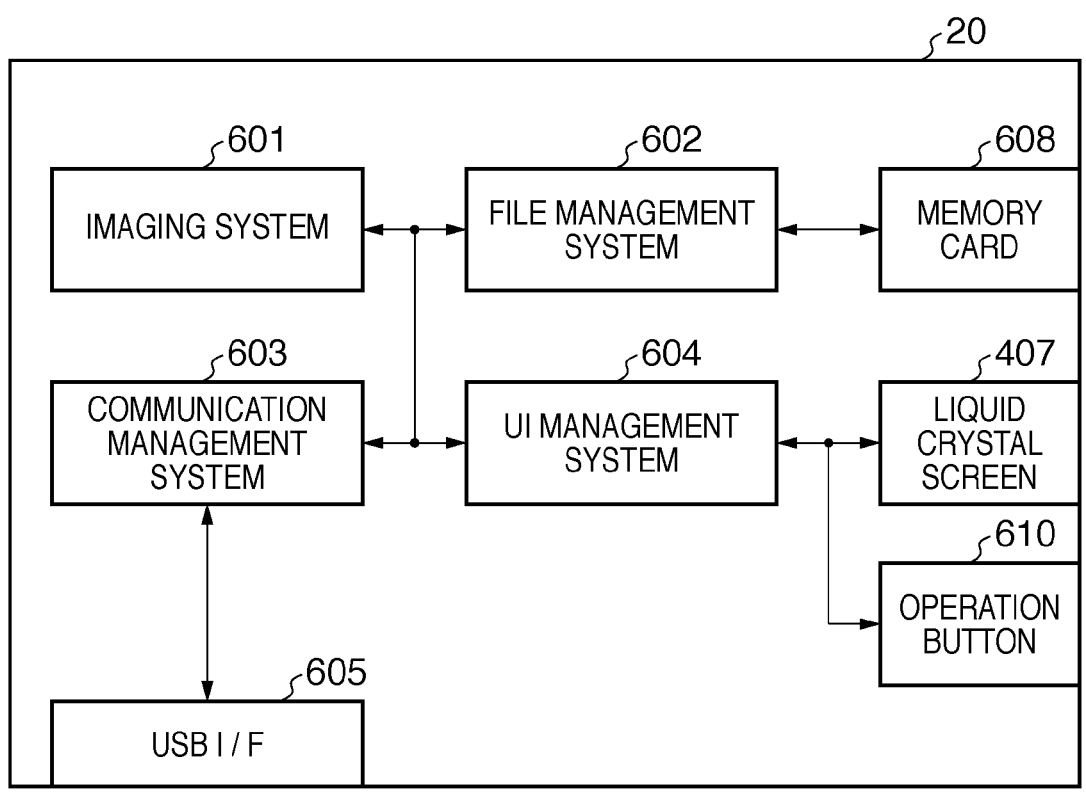
FIG. 6 is a block diagram showing an example of the functional arrangement of the digital camera 20 according to the embodiment.

FIG. 6 is a functional block diagram of the digital camera 20 of this embodiment. However, elements which are not directly required upon understanding the arrangement of this embodiment, for example, a CPU and a part associated with image playback are not shown. Note that an imaging system 601, file management system 602, communication management system 603, and UI management system 604 to be described below are respectively implemented by the system controller 550. That is, these systems are implemented when a CPU on the camera side (not shown) executes control programs loaded onto the system memory 552.

The imaging system 601 generates image data that represents a captured image by controlling a series of components required to capture an image. The series of components required to capture an image include the lens 503, the shutter 501 including an aperture, the image capturing unit 522 having a CCD, the A/D converter 523, the image processor 524, and the like.

The file management system 602 manages access to the recording medium 30 (to be referred to as a memory card 608 hereinafter) attached to the digital camera 20. The digital camera 20 of this embodiment comprises a CF (CompactFlash™) card as the detachable memory card 608. Image data generated by the imaging system 601 is stored as a file in the memory card 608.

The communication management system 603 communicates with an external computer via a USB interface 605.

The UI management system 604 controls a user interface (UI) of the main body of the digital camera 20. The UI management system 604 executes UI management in response to commands from the computer 10, management of display contents on the liquid crystal screen 407, management of inputs from an operation button 610, and the like. Note that the operation button 610 corresponds to various buttons 401 to 405 in FIG. 4 in practice, and includes a plurality of buttons.

The operation of the application software 310 according to this embodiment will be described below.

Figure 7:
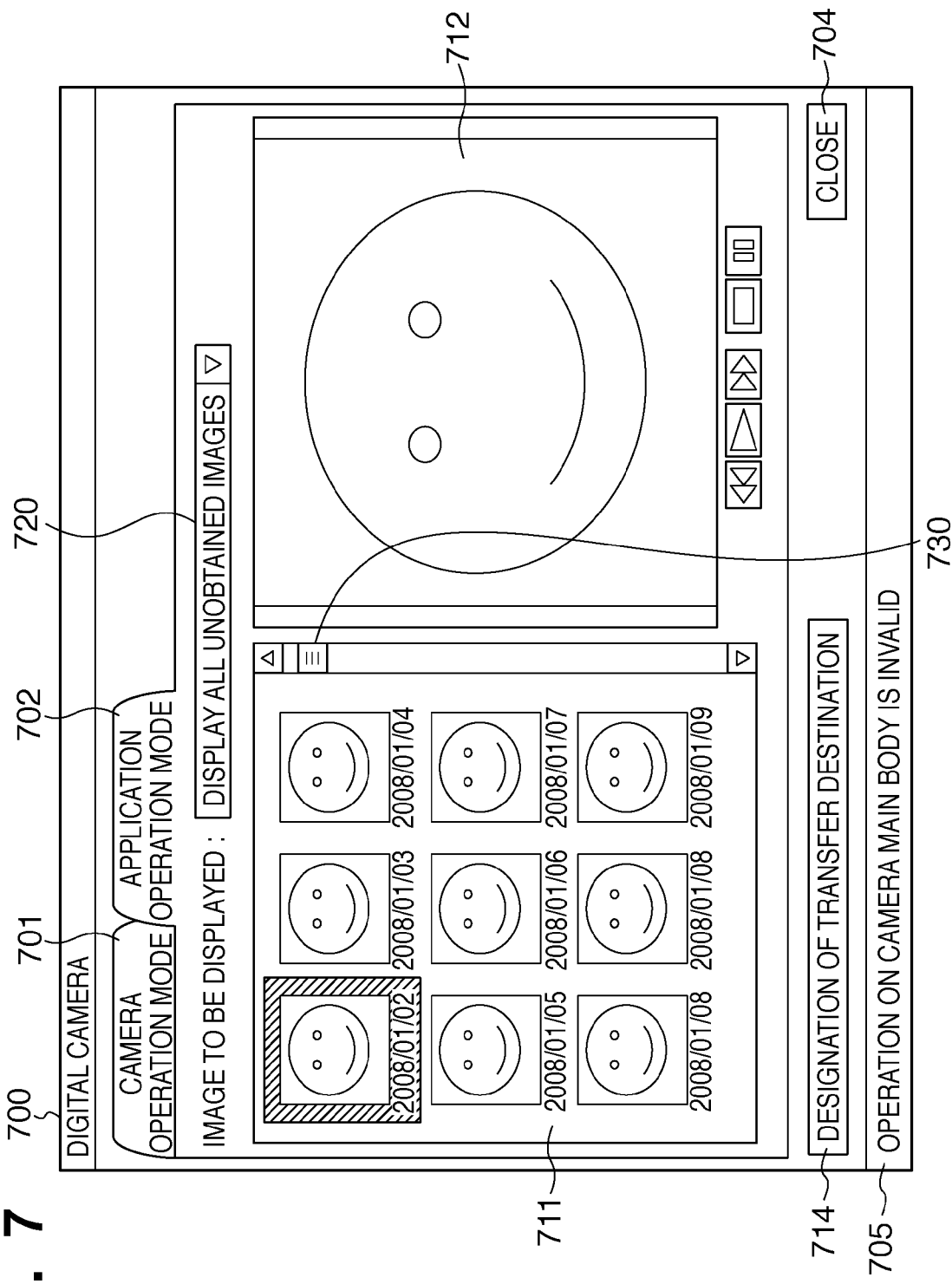
FIG. 7 is a view showing an example of a display window of application software according to the embodiment.
Figure 8:
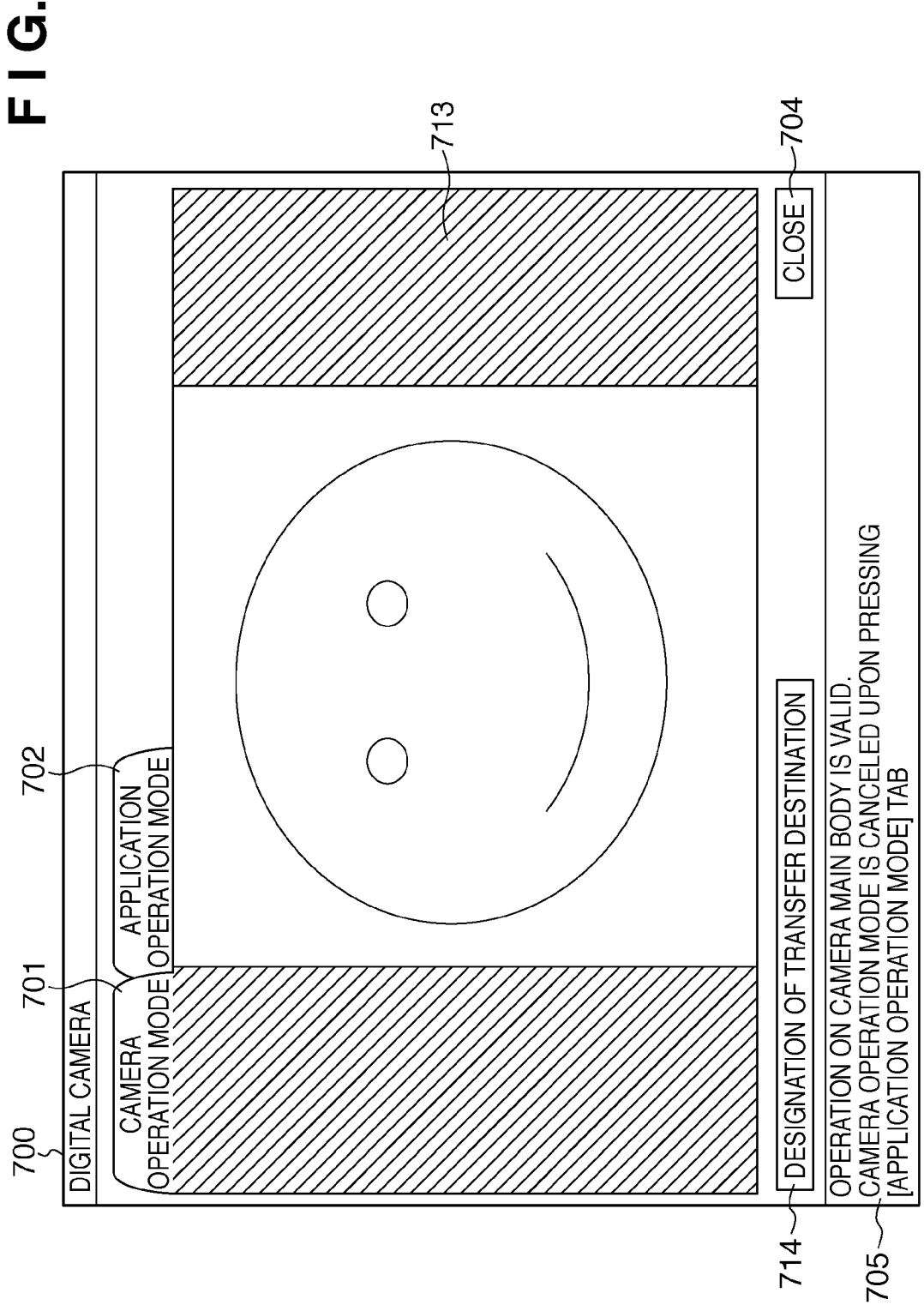
FIG. 8 is a view showing an example of a display window of the application software according to the embodiment.

FIGS. 7 and 8 show a graphical user interface (GUI) of the application software 310. A GUI 700 of the application software 310 includes tabs 701 and 702 used to select functions, as shown in FIGS. 7 and 8, and a UI is changed by selecting the tab. The tabs include a camera operation mode tab 701 and application operation mode tab 702. The application operation mode validates user's operations to browse data via the GUI provided by the application software. In more general terms, the application operation mode is an internal operation mode in which operations from the user interface in the information processing apparatus are valid. The camera operation mode validates a user's operations to browse data via the UI provided by the digital camera 20. In more general terms, the camera operation mode is an external operation mode in which operation instructions from an external apparatus are valid. When the application software 310 of this embodiment is activated by the image device management system 311, it is activated while the camera operation mode tab 701 is selected, and a window (GUI) shown in FIG. 8 is displayed. On the other hand, when the application software 310 is activated by the user from a menu or the like of the OS, it is activated while the application operation mode tab 702 is selected, and a window (GUI) shown in FIG. 7 is displayed.

When the application software 310 is activated, it accesses the digital camera 20 connected to the computer 10 and executes so-called backup processing irrespective of the selected tab. This backup processing is executed in the background. That is, the application software 310 automatically obtains image data from the digital camera 20 and saves them in the HDD 209 as files in the background. Note that image data to be obtained are those which have not been obtained by the computer yet of those stored in the memory card 608 of the digital camera 20. Independently of the backup processing (obtainment and storage of image data), the application software 310 can execute image data display processing. In this display processing, the user can request to display image data which have not been obtained yet at that time on the monitor of the computer. When the user inputs a display request of unobtained image data, these image data are displayed after they are obtained by the computer 10. That is, the application software 310 can display obtained image data while obtaining unobtained image data by the computer in the background. As will be apparent from the following description, in this embodiment, response to the browse operation is improved by controlling the obtainment order of image data in the backup processing according to the display request.

FIG. 7 shows the GUI 700 by the application software 310 while the application operation mode tab 702 is selected. The GUI 700 displays a list of reduced images (thumbnails) of image data on an image list display area 711. The reduced images displayed on this area are those of image data which have never been obtained by the computer at the activation timing of the application software 310 of those stored in the memory card 608 attached to the digital camera 20. The user can designate a desired reduced image using the pointing device 14 from the image list display area 711. A main image display area 712 displays a body image corresponding to the designated reduced image.

Upon operation of a transfer destination designation button 714, the user can designate a saving destination (e.g., a drive name and directory name) upon saving image data obtained from the digital camera 20 in the HDD 209 as an image file.

A filtering condition setting menu 720 is used to filter reduced images to be displayed on the image list display area 711. Four items "display all unobtained images", "display only unobtained still images", "display only unobtained movies", and "display unobtained images by designating period" can be selected from the filtering condition setting menu 720.

The item "display all unobtained images" is a default item immediately after the application software 310 is activated. When this item is designated, reduced images corresponding to all image data which have never been obtained by the computer of those stored in the memory card 608 of the digital camera 20 are displayed on the image list display area 711.

Upon designation of the item "display only unobtained still images", only reduced images corresponding to unobtained still image data of image data stored in the memory card 608 of the digital camera 20 are displayed on the image list display area 711.

Upon designation of the item "display only unobtained movies", only reduced images corresponding to unobtained movie data of image data stored in the memory card 608 of the digital camera 20 are displayed on the image list display area 711.

Upon designation of the item "display unobtained images by designating period", only reduced images corresponding to unobtained image data of those which were captured during a specific period designated on a period setting window (not shown) are displayed on the image list display area 711. The imaging date and time can be specified by referring to imaging date and time information appended upon capturing an object image and generating image data, or the date and time of generation of a file.

A close button 704 is designated upon quitting the application software 310.

Figure 10:
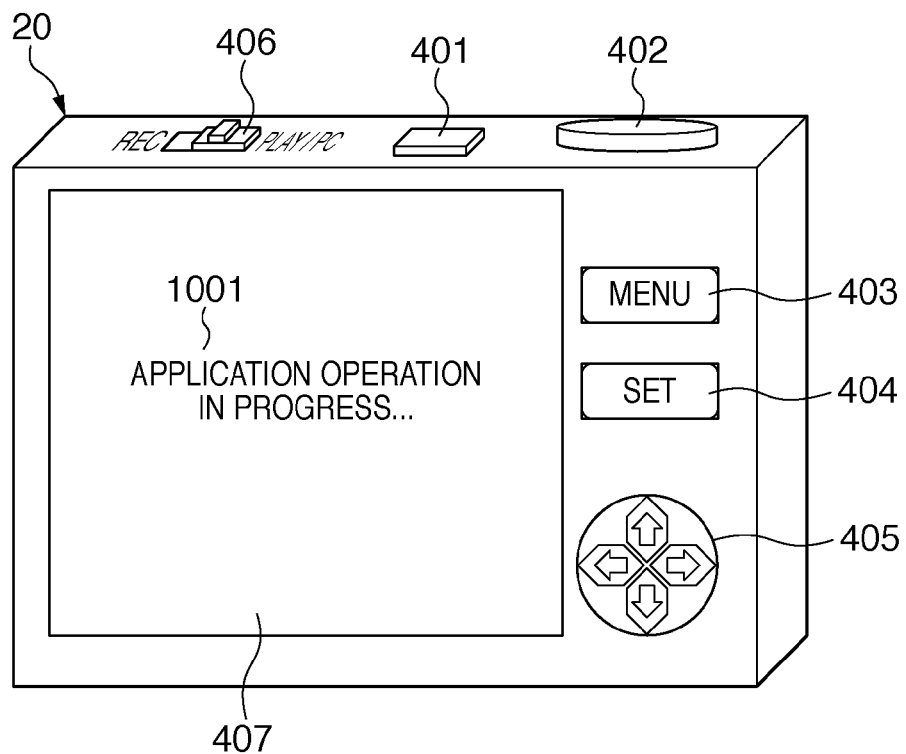
FIG. 10 is a view showing a screen display example on the digital camera according to the embodiment.

While the application operation mode tab 702 is selected, the UI of the digital camera 20 is invalidated, and the user cannot operate the main body of the digital camera 20. Therefore, a message display area 705 of the GUI 700 displays a message indicating this (FIG. 10).

On the other hand, while the camera operation mode tab 701 is selected, as shown in FIG. 8, only the image transfer destination designation button 714, close button 704, and application operation mode tab 702 can be designated on the GUI 700. The message display area 705 displays a message for the camera operation mode, and the main image display area 712 displays an image designated by operating the digital camera 20.

Figure 9:
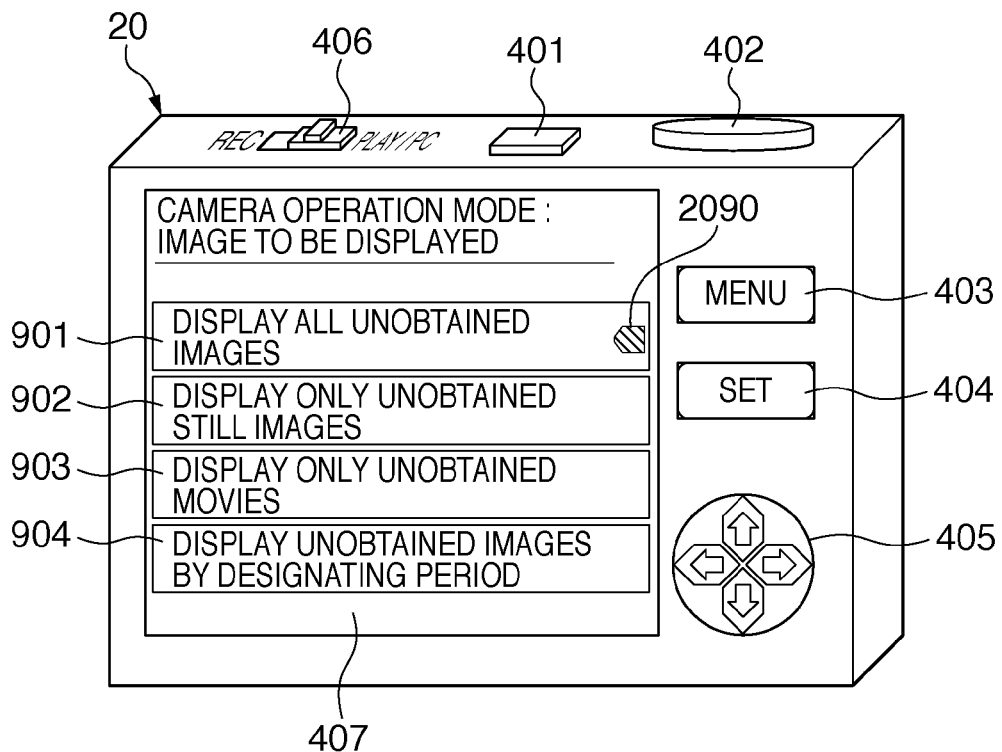
FIG. 9 is a view showing a screen display example on the digital camera according to the embodiment.

While the camera operation mode tab 701 is selected, the UI including the liquid crystal screen 407 is validated on the digital camera 20, as shown in FIG. 9, and a menu for the camera operation mode is displayed on the liquid crystal screen 407. The user can filter image data to be displayed on the main image display area 713 by the application software 310 from those stored in the memory card 608 by operating the UI of the digital camera 20. That is, images that fit any of the filtering conditions (conditions 901 to 904) selected by the menu displayed on the liquid crystal screen 407 of the digital camera 20 are displayed one by one on the main image display area 713 of the application software 310. Then, the user can switch an image to be displayed on the main image display area 713 by the application software 310 using a right or left button of the operation button 610 (arrow button 405) of the digital camera 20.

In this embodiment, the user can set the following four filtering conditions on the digital camera main body in the camera operation mode, as shown in FIG. 9.

The first condition is the "display all unobtained images" filtering condition 901. Upon designation of this filtering condition 901, all image data which have never been obtained by the computer of those stored in the memory card 608 are selected as those to be displayed on the main image display area 713 of the application software 310.

The second condition is the "display only unobtained still images" filtering condition 902. Upon designation of this filtering condition 902, only still image data which have never been obtained by the computer of image data stored in the memory card 608 are selected as those to be displayed on the main image display area 713.

The third condition is the "display only unobtained movies" filtering condition 903. Upon designation of this filtering condition 903, only movie image data which have never been obtained by the computer of image data stored in the memory card 608 are selected as those to be displayed on the main image display area 713.

The fourth condition is the "display unobtained images by designating period" filtering condition 904. Upon designation of this filtering condition 904, a period designated by a period setting window (not shown) is added to the filtering condition. That is, only image data which were captured during the designated period and have never been obtained by the computer of those stored in the memory card 608 are selected as those to be displayed on the main image display area 713. A cursor 2090 indicates the selected filtering condition.

When the user designates the application operation mode tab 702 of the application software 310 using the mouse or the like in this state, the control leaves the camera operation mode and can transit to the application operation mode. After transition to the application operation mode, the UI including the operation button 610 and the like of the digital camera 20 is invalidated, and the liquid crystal screen 407 displays a message 1001 indicating the application operation mode, as shown in FIG. 10.

Figure 11:
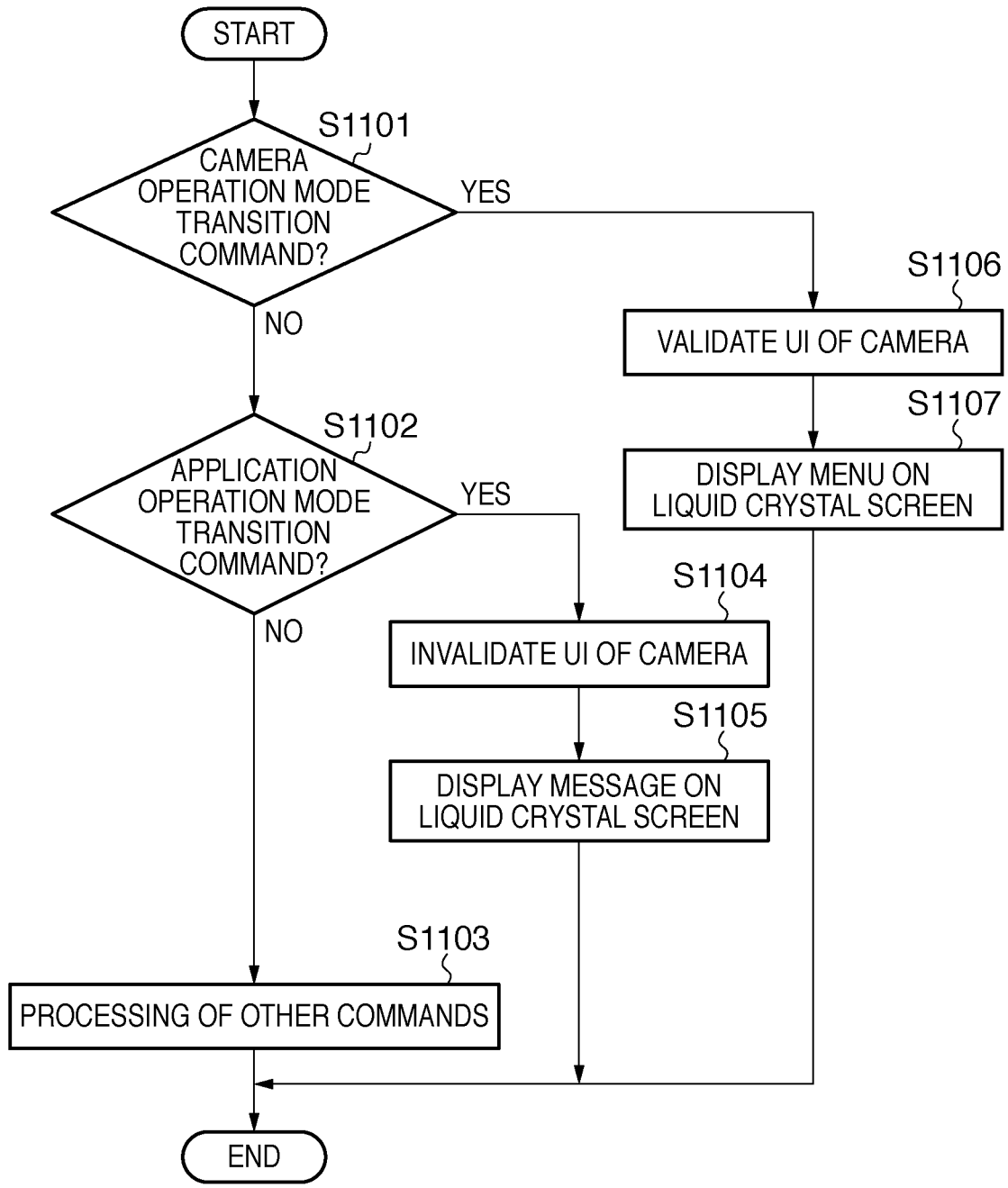
FIG. 11 is a flowchart showing the operation of the digital camera according to the embodiment.

FIG. 11 is a flowchart for explaining the operation of a command message processing routine that processes commands from the computer 10 in the digital camera 20. Commands from the computer 10 are fetched by the digital camera 20 via the USB interface 605 and communication management system 603.

The UI management system 604 of the digital camera 20 determines in step S1101 if the fetched command is a camera operation mode transition command. The camera operation mode transition command will be described later. If the fetched command is the camera operation mode transition command, the process advances to step S1106. In step S1106, the UI management system 604 sets to validate the operation button 610 and liquid crystal screen 407 of the digital camera 20 as the UI. After that, in step S1107 the UI management system 604 displays the menu of the filtering conditions shown in FIG. 9 on the liquid crystal screen 407.

On the other hand, if the fetched command is not the camera operation mode transition command in step S1101, the process advances to step S1102. The UI management system 604 determines in step S1102 if the fetched command is an application operation mode transition command. The application operation mode transition command will be described later. If it is determined that the fetched command is the application operation mode transition command, the process advances to step S1104. In step S1104, the UI management system 604 sets to invalidate the UI including the operation button 610 and the like of the digital camera 20. After that, in step S1105 the UI management system 604 displays the message 1001 shown in FIG. 10 on the liquid crystal screen 407.

If a signal input from the computer 10 is neither the camera operation mode transition command nor the application operation mode transition command, the process advances to step S1103. In step S1103, the system controller 550 of the digital camera 20 executes processes suited to other commands. These processes include that for transferring a file obtainment management list (to be described later) to the PC, which is executed by the file management system 602. Since other processes are not directly related to the present invention, a description thereof will not be given.

The operation upon activating the application software 310 will be described below using the flowchart shown in FIG. 12.

In step S1201, the application software 310 executes activation initialization processing. This processing includes allocation of required memories, initialization of variables, initialization processing to the digital camera 20 as a connection target, and the like. Since these processes are general, and are not directly related to the present invention, a detailed description thereof will not be given.

Figure 13:
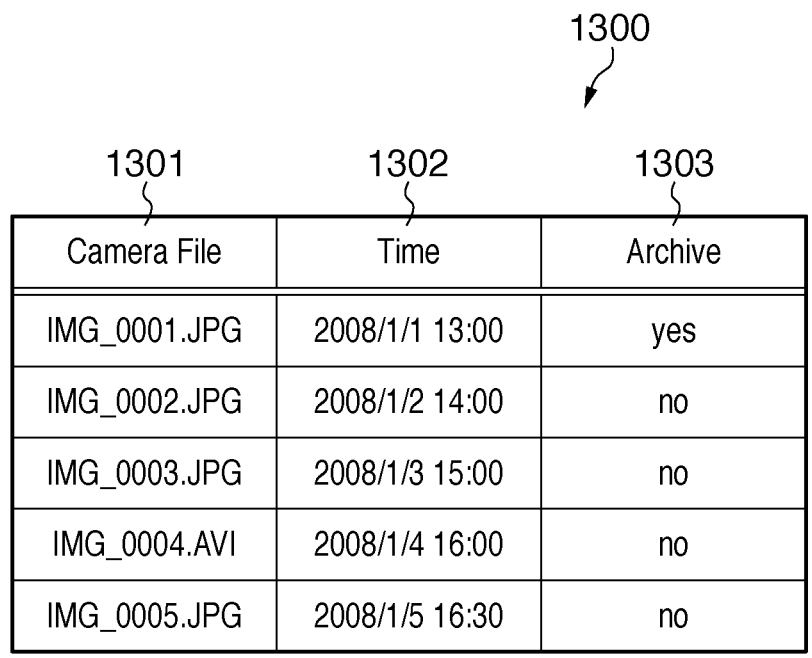
FIG. 13 is a table sowing an example of the data configuration of an image list according to the embodiment.

In step S1202, the obtainment order manager 319 obtains information of all image data saved in the memory card 608 attached to the digital camera 20 from the connected digital camera 20. More specifically, the obtainment order manager 319 obtains a list of file names and attribute information of all files in the memory card 608, and reduced image data of all these files. This processing obtains, in advance, reduced image data corresponding to image data (second obtaining processing) before obtainment of image data to be described later using FIG. 22 (first obtaining processing: step S2206). That is, at this time, an image list 1300 which includes file names 1301, time stamps 1302, and archive attribute information 1303 for all files in the memory card 608 is obtained, as shown in FIG. 13. All reduced image data used to be displayed on the image list display area 711 can also be obtained. Note that the respective file names in the image list 1300 and reduced image data (thumbnails) are associated with each other. When one of reduced image data displayed on the image list display area 711 is selected, the file name of a file associated with that reduced image data is recognized. The same applies to a file obtainment management list 1400 to be described later. The obtainment order manager 319 obtains information from the digital camera 20 via camera connection/data communication manager 315.

Note that the reduced image data obtained in step S1202 are displayed as a list on the window shown in FIG. 7.

In step S1203, the obtainment order manager 319 generates a file obtainment management list from the image list 1300 obtained in step S1202. FIG. 14 shows an example of the data configuration of the file obtainment management list 1400 according to this embodiment. The file obtainment management list 1400 of this embodiment collects files including archive attribute information="no" from the image list 1300 shown in FIG. 13.

In this embodiment, upon obtaining image data from the digital camera 20, the obtainment order manager 319 sets archive attribute information of the corresponding image file in the memory card 608 as the obtainment source to be "yes". Hence, by collecting only files including archive attribute information="no", a set of files which have not been obtained by the computer yet is consequently formed. That is, a set of files to be handled by the application software 310 is formed.

In step S1204, the GUI manager 321 branches processes depending on the activation methods of the application software 310. That is, if the user activates the application software 310 from a menu of the OS 300 or the like while the digital camera 20 is connected to the computer, the process advances to step S1208.

On the other hand, if the image device management system 311 of the OS 300 activates the application software 310 in response to, as a key, (1) an electrical connection between the digital camera 20 and computer 10, or (2) a logical connection between the digital camera 20 and OS 300 (corresponding to, e.g., "auto play" in Microsoft Windows™), the process advances to step S1205.

When the process advances to step S1205, it is assumed that the user has the digital camera 20 in hand. For this reason, in step S1205 the GUI manager 321 and obtainment order manager 319 control the image data obtaining unit 318 to start image obtaining processing required to display the GUI 700 at the time of selection of the camera operation mode tab 701. In this case, processing for obtaining images is executed as an independent thread by the image data obtaining unit 318. Details will be described later.

In step S1206, the GUI manager 321 sets the window of the application software 310 in a state in which the camera operation mode tab 701 is selected. After that, in step S1207 the GUI manager 321 issues a camera operation mode transition command to the digital camera 20. Upon reception of this command, the digital camera 20 validates the UI including the operation button 610 and the like, and displays the menu shown in FIG. 9 on the liquid crystal screen 407, as described above.

On the other hand, when the process advances to step S1208, the user activates the application software 310 by operating the menu using the mouse. In this case, such operation implicates that the user wants to execute various kinds of processing by operating the operation unit 204 of the computer 10. Therefore, in step S1208 the obtainment order manager 319 controls the image data obtaining unit 318 to start image obtaining processing for the application operation mode. After that, this image obtaining processing is processed as an independent thread, which is executed parallel to a main thread.

In step S1209, the GUI manager 321 displays the GUI window of the application software 310 while the applicator operation mode tab 702 is selected (FIG. 7). After that, in step S1210 the GUI manager 321 issues an application operation mode setting command to the digital camera 20. Upon reception of this command, the digital camera 20 invalidates the UI including the operation button 610 and the like, and displays the message shown in FIG. 10 on the liquid crystal screen 407, as described above.

The processing in step S1205 in FIG. 12 will be described below using the flowchart shown in FIG. 15. Note that this processing is executed when the application software 310 is activated in the camera operation mode, when the operation mode transits from the application operation mode to the camera operation mode, or when the user operates the UI of the camera main body in the camera operation mode to change the display filtering condition.

Figure 15:
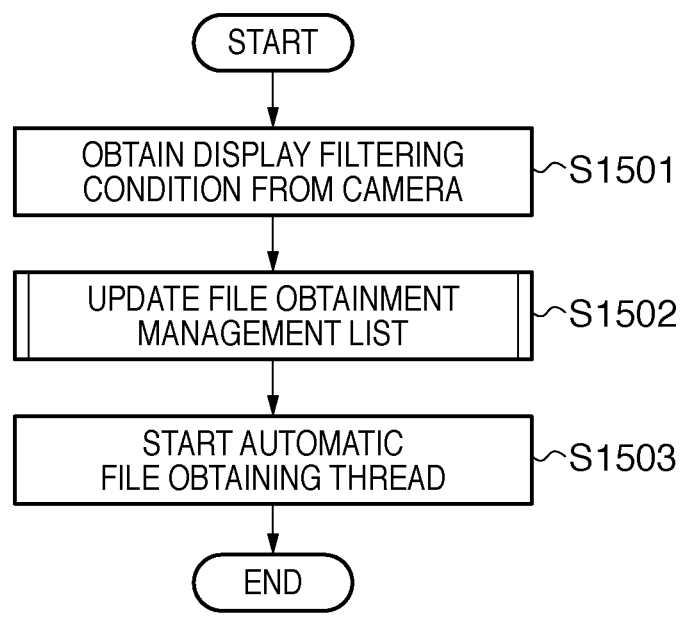
FIG. 15 is a flowchart showing the operation of the application software according to the embodiment, that is, image obtaining processing in a camera operation mode.

In step S1501 in FIG. 15, the obtainment order manager 319 obtains the filtering condition selected at the digital camera 20 by communicating with the digital camera 20. In step S1502, the obtainment order manager 319 generates the file obtainment management list 1400. If the file obtainment management list 1400 already exists, the unit 319 updates the existing file obtainment management list 1400. The generation and updating methods of the file obtainment management list 1400 will be described later. After the file obtainment management list 1400 is generated, in step S1503 the obtainment order manager 319 activates an automatic file obtaining thread for obtaining images according to the file obtainment management list 1400, thus ending the processing. The automatic file obtaining thread is executed by the image data obtaining unit 318. This automatic file obtaining thread executes saving processing for sequentially obtaining data stored in a memory medium attached to an electronic device from that electronic device connected to the information processing apparatus, and saving them. Particularly, as the saving processing of this embodiment, so-called backup processing for obtaining and saving only image data which have never been obtained previously by the computer is executed.

On the other hand, the processing in step S1208 in FIG. 12 as that in the application operation mode will be described below using the flowchart shown in FIG. 16.

Note that this processing is also executed when the application software 310 is activated in the application operation mode, when the operation mode transits from the camera operation mode to the application operation mode, when the user operates the GUI of the application software 310 in the application operation mode to change the display filtering condition, or when the user scrolls the image list display area 711 by operating a scroll bar 730.

In step S1601, the obtainment order manager 319 obtains the filtering condition set via the filtering condition setting menu 720 of the application software 310 or scroll position information of the image list display area 711.

In step S1602, the obtainment order manager 319 generates the file obtainment management list 1400. If the file obtainment management list 1400 already exists, the unit 319 updates the existing file obtainment management list 1400. The generation and updating methods of the file obtainment management list 1400 will be described later.

After the file obtainment management list 1400 is generated, in step S1603 the obtainment order manager 319 activates an automatic file obtaining thread for obtaining images according to the file obtainment management list 1400, thus ending this processing. The automatic file obtaining thread is executed by the image data obtaining unit 318. The automatic file obtaining thread is equivalent to the processing executed in step S1503.

Figure 17:
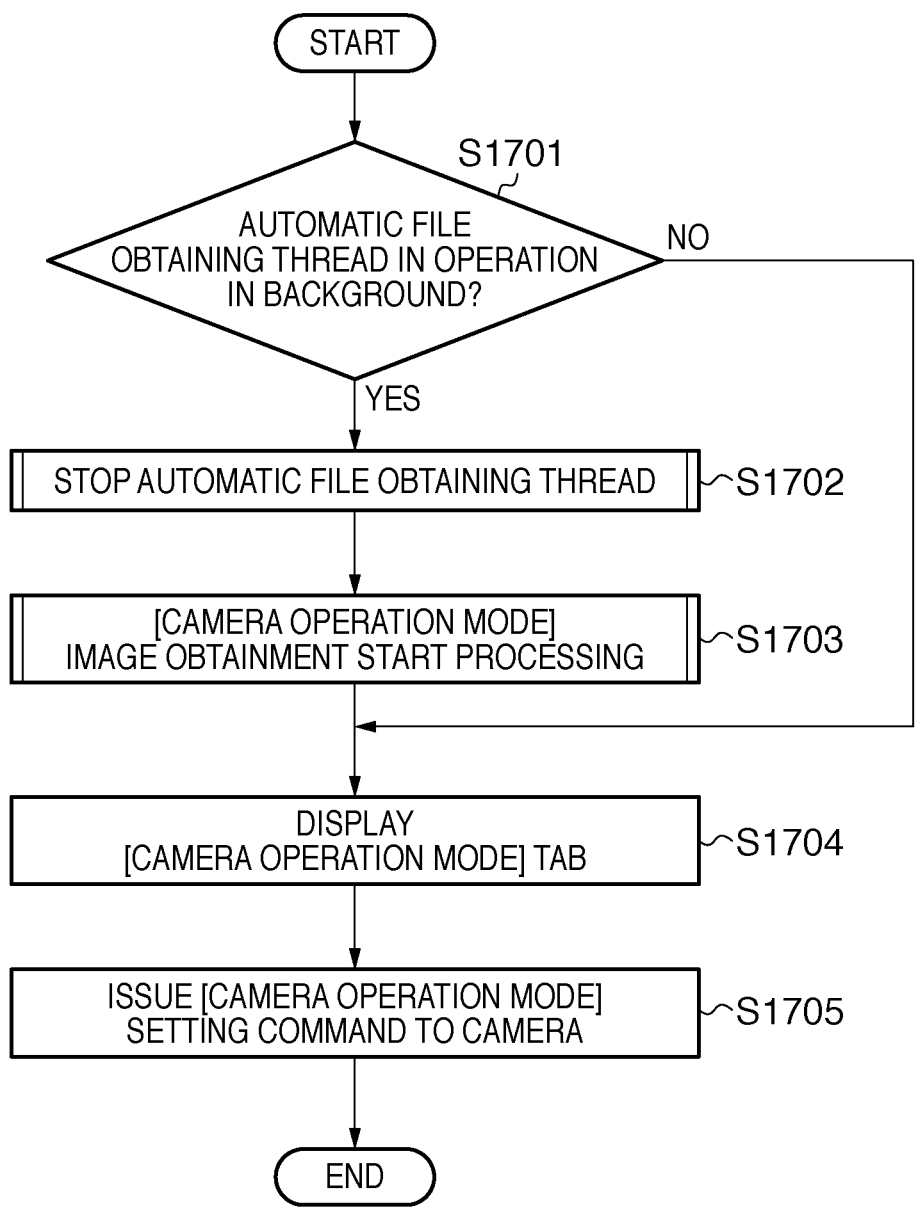
FIG. 17 is a flowchart showing the operation of the application software according to the embodiment, that is, processing upon instructing to switch from the application operation mode to the camera operation mode.

The operation of the computer 10 upon pressing of the camera operation mode tab while image data are automatically obtained in the background in the application operation mode will be described below using the flowchart shown in FIG. 17.

The obtainment order manager 319 checks in step S1701 if the automatic file obtaining thread is in operation in the background. If the automatic file obtaining thread is active (in operation), the process advances to step S1702; otherwise, the process jumps to step S1704.

In step S1702, the obtainment order manager 319 stops the automatic file obtaining thread in operation. In step S1703, the obtainment order manager 319 executes the image obtainment start processing in the camera operation mode, which has been explained using FIG. 15. In step S1704, the GUI manager 321 switches the display of the application software 310 to a state in which the camera operation mode tab 701 is pressed. In step S1705, the GUI manager 321 issues a camera operation mode transition command to the digital camera 20.

Figure 18:
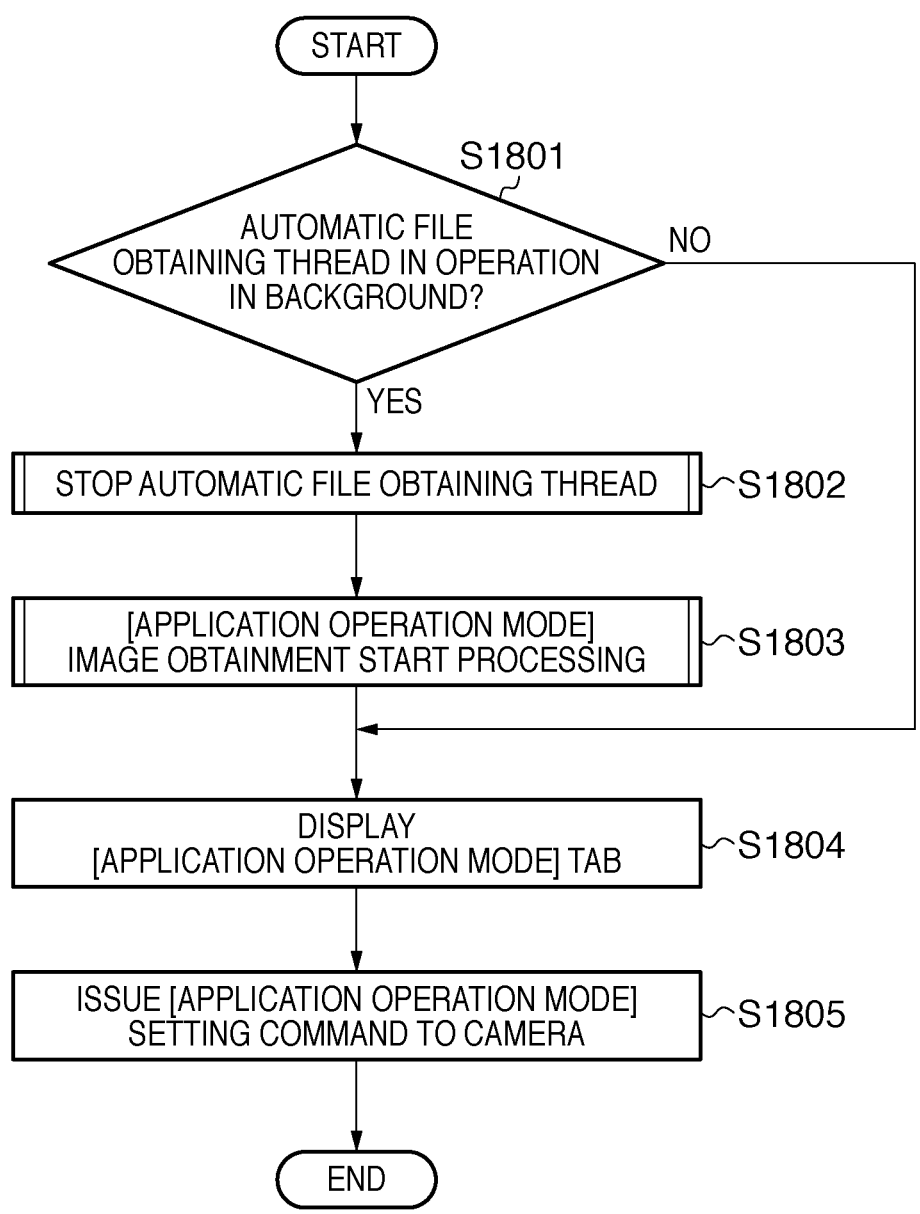
FIG. 18 is a flowchart showing the operation of the application software according to the embodiment, that is, processing upon instructing to switch from the camera operation mode to the application operation mode.

Conversely, the operation upon pressing of the application operation mode tab 702 while the automatic file obtaining thread obtains image data from the digital camera 20 in the background in the camera operation mode will be described below using the flowchart shown in FIG. 18.

The obtainment order manager 319 checks in step S1801 if the automatic file obtaining thread is active in the background. If the automatic file obtaining thread is in operation, the process advances to step S1802; otherwise, the process jumps to step S1804.

In step S1802, the obtainment order manager 319 stops the automatic file obtaining thread in operation. In step S1803, the obtainment order manager 319 executes the image obtainment start processing in the application operation mode, which has been explained using FIG. 16. In step S1804, the GUI manager 321 switches the display of the application software 310 to a state in which the application operation mode tab 702 is pressed. In step S1805, the GUI manager 321 issues an application operation mode transition command to the digital camera 20.

Figure 19:
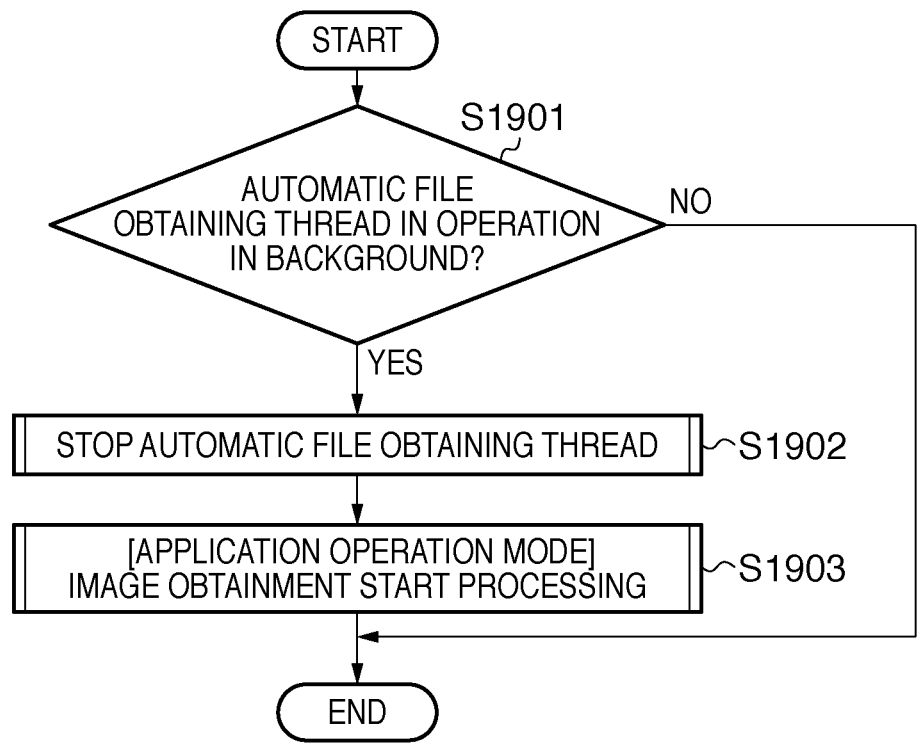
FIG. 19 is a flowchart showing the operation of the application software according to the embodiment, that is, the operation upon changing a display condition (e.g., upon changing a filtering condition or a reduced image list display)

The operation of the application software 310 upon operation of the filtering condition setting menu 720 or the scroll bar 730 in FIG. 7 will be described below using the flowchart shown in FIG. 19. That is, the operation of the application software 310 when the display condition is changed (e.g., when the filtering condition is changed or when the list display of reduced images is changed) will be explained below.

The obtainment order manager 319 checks in step S1901 (FIG. 19) if the automatic file obtaining thread is in operation in the background. If the automatic file obtaining thread is in operation, the process advances to step S1902. On the other hand, if the automatic file obtaining thread is not in operation, since obtainment of all images is complete, the processing associated with obtainment ends, and only the display is updated.

In step S1902, the obtainment order manager 319 stops the automatic file obtaining thread in operation. In step S1903, the obtainment order manager 319 executes the image obtainment start processing in the application operation mode, which has been explained using FIG. 16. At this time, the obtainment order manager 319 updates the file obtainment management list in step S1602 so as to obtain image data in the order according to the operation of the filtering condition setting menu 720 or the scroll bar 730. After that, the processing of this flowchart ends.

Figure 20:
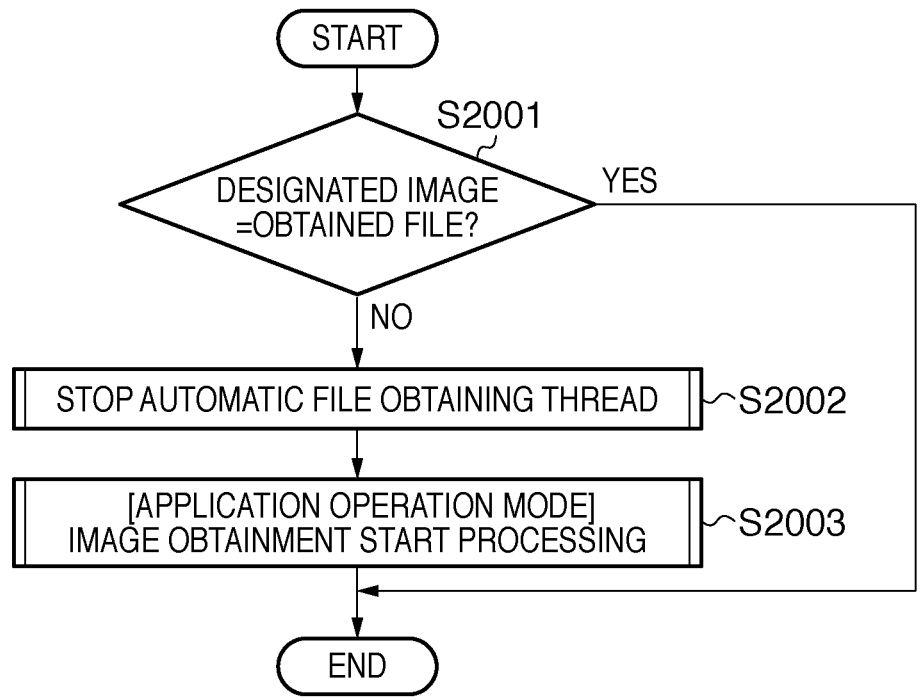
FIG. 20 is a flowchart showing the operation of the application software according to the embodiment, that is, the operation upon changing designation of a reduced image, a main image of which is to be displayed, as the display condition.

The processing executed when the user designates a reduced image displayed on the image list display area 711 using the mouse, keyboard, or the like while the application operation mode tab 702 is selected will be described below using the flowchart shown in FIG. 20. That is, the operation executed when the user changes designation of a reduced image, the main image of which is to be displayed, will be described.

The obtainment order manager 319 checks in step S2001 if a main image corresponding to a newly selected reduced image has already been obtained from the digital camera 20 by the computer 10. This checking processing can be implemented with reference to the file obtainment management list 1400, and details thereof will be described later. If the main image corresponding to the selected reduced image has not been obtained from the digital camera 20 yet, the process advances to step S2002. In step S2002, the obtainment order manager 319 stops the automatic file obtaining thread in operation. After that, the obtainment order manager 319 executes the image obtainment start processing in the application operation mode, which has been explained using FIG. 16, in step S2003. After that, the processing of this flowchart ends.

If it is determined in step S2001 that the main image corresponding to the newly selected reduced image is an already obtained file, obtainment of the main image corresponding to the newly selected reduced image is complete. Therefore, the processing in FIG. 20 associated with obtainment ends, and the display is updated.

Figure 21:
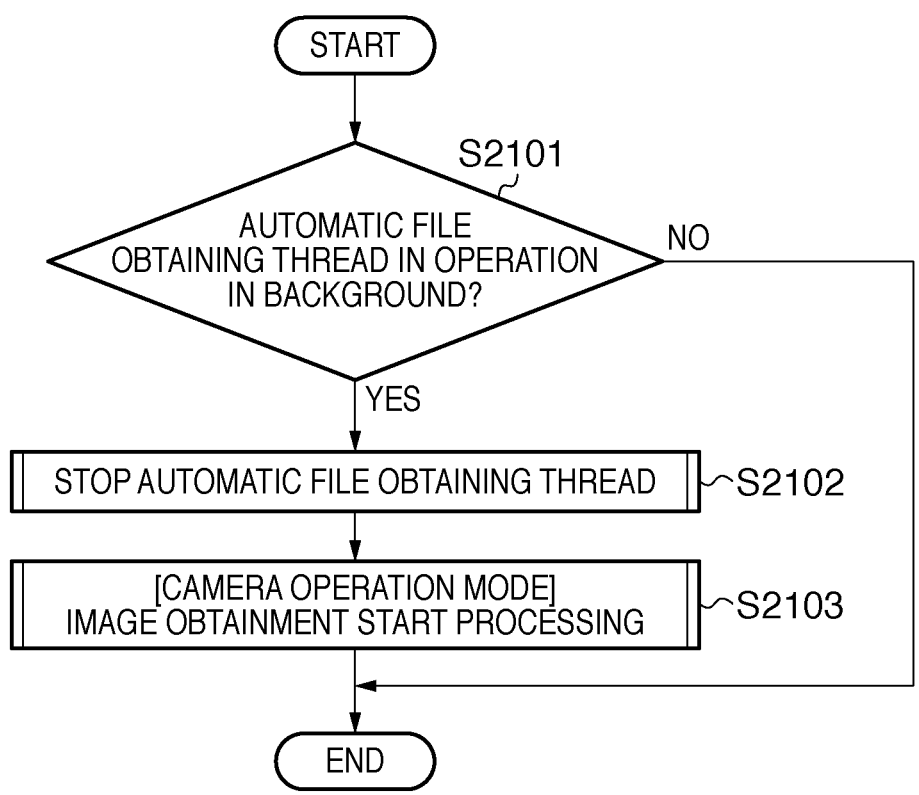
FIG. 21 is a flowchart showing the operation of the application software according to the embodiment, that is, the operation upon giving an instruction to change the display condition on the digital camera 20.

The operation of the application software 310 when the user operates the filtering condition selection menu (FIG. 9) at the digital camera 20 to change the filtering condition in the camera operation mode will be described below using the flowchart shown in FIG. 21. That is, FIG. 21 shows the flowchart used to explain the operation of the application software 310 when the user gives an instruction to change the display condition at the digital camera 20. When the filtering condition is changed at the digital camera 20, the digital camera 20 sends an event notification that advises accordingly to the computer 10. When the camera connection/data communication manager 315 of the application software 310 receives this event notification, the obtainment order manager 319 executes the processing in FIG. 21 in response to that reception as a trigger.

The obtainment order manager 319 checks in step S2101 if the automatic file obtaining thread is in operation in the background. If the automatic file obtaining thread is in operation, the process advances to step S2102. On the other hand, if the automatic file obtaining thread is not in operation, since all images have already been obtained, processing associated with obtainment ends, and an image to be displayed on the main image display area 713 is only updated.

If the automatic file obtaining thread is active, the obtainment order manager 319 stops the automatic file obtaining thread in step S2102.

In step S2103, the obtainment order manager 319 executes the image obtainment start processing in the camera operation mode, which has been described using FIG. 15. After that, the processing of this flowchart ends.

The processing of the automatic file obtaining thread will be described below using the flowchart shown in FIG. 22. The automatic file obtaining thread is executed by the image data obtaining unit 318 of the application software 310.

Figure 22:
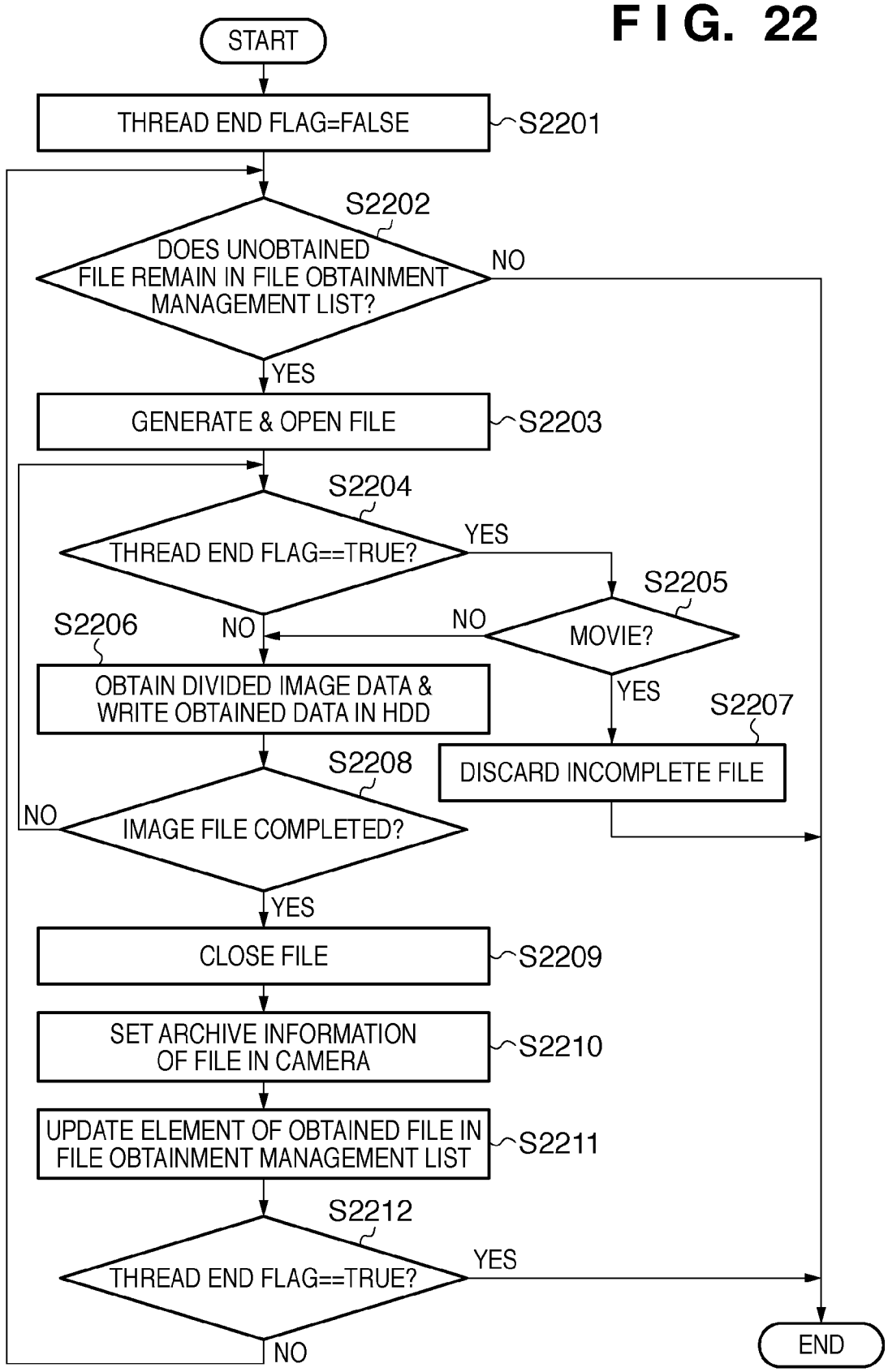
FIG. 22 is a flowchart showing the operation of an automatic file obtaining thread in the application software of the embodiment.

Referring to FIG. 22, if the thread is started, a thread end flag is reset (=FALSE) in step S2201. The thread end flag is used when this automatic file obtaining thread is ended from an external thread.

The image data obtaining unit 318 checks in step S2202 if the file obtainment management list 1400 includes unobtained files. The file obtainment management list 1400 and a method of checking unobtained files will be described in detail later.

If unobtained files still remain, the process advances to step S2203. The subsequent processes in steps S2203 to S2211 are those for obtaining one file included in the file obtainment management list 1400. Files managed in the file obtainment management list 1400 are processed in turn from a file having the highest obtainment priority order.

Upon obtaining an image file stored in the memory card 608 of the digital camera 20, this application software 310 obtains one file while dividing it by a predetermined data size. For this reason, normally, a loop including steps S2204, S2206, and S2208 is repeated a plurality of times to obtain one file. That is, first obtaining processing for obtaining image data stored in a memory medium connected to an electronic device from the electronic device (digital camera 20) connected to the information processing apparatus is executed.

In step S2203, the image data obtaining unit 318 generates and opens a file used to store data obtained from the digital camera 20. The image data obtaining unit 318 checks the thread end flag in step S2204. With this checking processing, whether or not to receive an end request from another thread is checked. If the thread end flag is FALSE, the unit 318 determines that no end request is received from another thread, and the process advances to step S2206. On the other hand, if the thread end flag is TRUE, the unit 318 determines that the end request is received from another thread, and the process advances to step S2205.

The image data obtaining unit 318 checks in step S2205 if the file to be obtained is movie data. If it is determined that the file to be obtained is movie data, the process advances to step S2207, and the image data obtaining unit 318 discards the file generated in step S2203, thus ending this processing. On the other hand, if it is determined in step S2205 that the file to be obtained is not movie data, the process advances to step S2206.

In step S2206, the image data obtaining unit 318 sends a command to the digital camera 20 to obtain divided image data, and adds the obtained data to the file opened in step S2203.

The image data obtaining unit 318 confirms in step S2208 if divided data are obtained the required number of times in association with the image data to be obtained, that is, all the divided data have been obtained. If not all the data have been obtained yet, the process returns to step S2204. If all the data have been obtained, the process advances to step S2209, and the image data obtaining unit 318 closes that file.

After that, in step S2210 the image data obtaining unit 318 issues, to the camera, a command for setting archive attribute information of the corresponding file in the digital camera 20 (the file, the data of which has been obtained by the aforementioned processes). Note that this system checks using the archive attribute information as a key whether or not an image has ever been transferred to the computer.

In step S2211, the image data obtaining unit 318 updates the contents of elements corresponding to the obtained file included in the file obtainment management list 1400 to indicate that the file has already been obtained. More specifically, the unit 318 updates the archive attribute information included in the file obtainment management list 1400, and writes the path of the file generated in step S2203 in the list 1400, as will be described later.

In step S2212, the image data obtaining unit 318 confirms the thread end flag again. If the thread end flag is TRUE, this processing ends. If the thread end flag is not TRUE, the process returns to step S2202 to process the remaining elements included in the file obtainment management list 1400. If the image data obtaining unit 318 determines in step S2202 that the file obtainment management list 1400 includes no unobtained file, it ends the series of processes. As a result, the automatic file obtaining thread disappears.

With the aforementioned processing, image data are transferred from the digital camera 20 to the computer 10 in accordance with the file obtainment management list 1400, and are saved as files. Upon reception of an end request of the automatic file obtaining thread from another thread, if an image, whose obtaining processing is underway, is a still image, one image file is preferentially obtained, and the thread ends after one image data is obtained. In case of a still image, since the data size is small and a time period required for transfer is short, even when the thread ends after completion of obtainment of that still image, a waiting time period after the end request can be short. On the other hand, if an image whose obtaining processing is underway is movie data, since it may have a large data size, obtainment of that movie data is stopped in consideration of the waiting time period after the end request, thus immediately ending the automatic file obtaining thread. As can be seen from the above description, when another thread wants to end the automatic file obtaining thread, it sets the thread end flag to be TRUE, and then waits until the automatic file obtaining thread disappears.

The processing associated with the file obtainment management list 1400 will be described below. The processing to be described below is executed by the obtainment order manager 319.

FIG. 14 conceptually shows the file obtainment management list 1400.

The file obtainment management list 1400 includes a file name 1401 of image data saved in the camera, a time stamp 1402 of that file, archive attribute information 1403 held by the file system as attribute information, filtering information 1404 indicating whether or not a file is to be displayed by the application software 310, an obtainment priority order 1405 from the digital camera 20, and a file path 1406 in the HDD 209 where obtained image data is saved.

Figure 12:
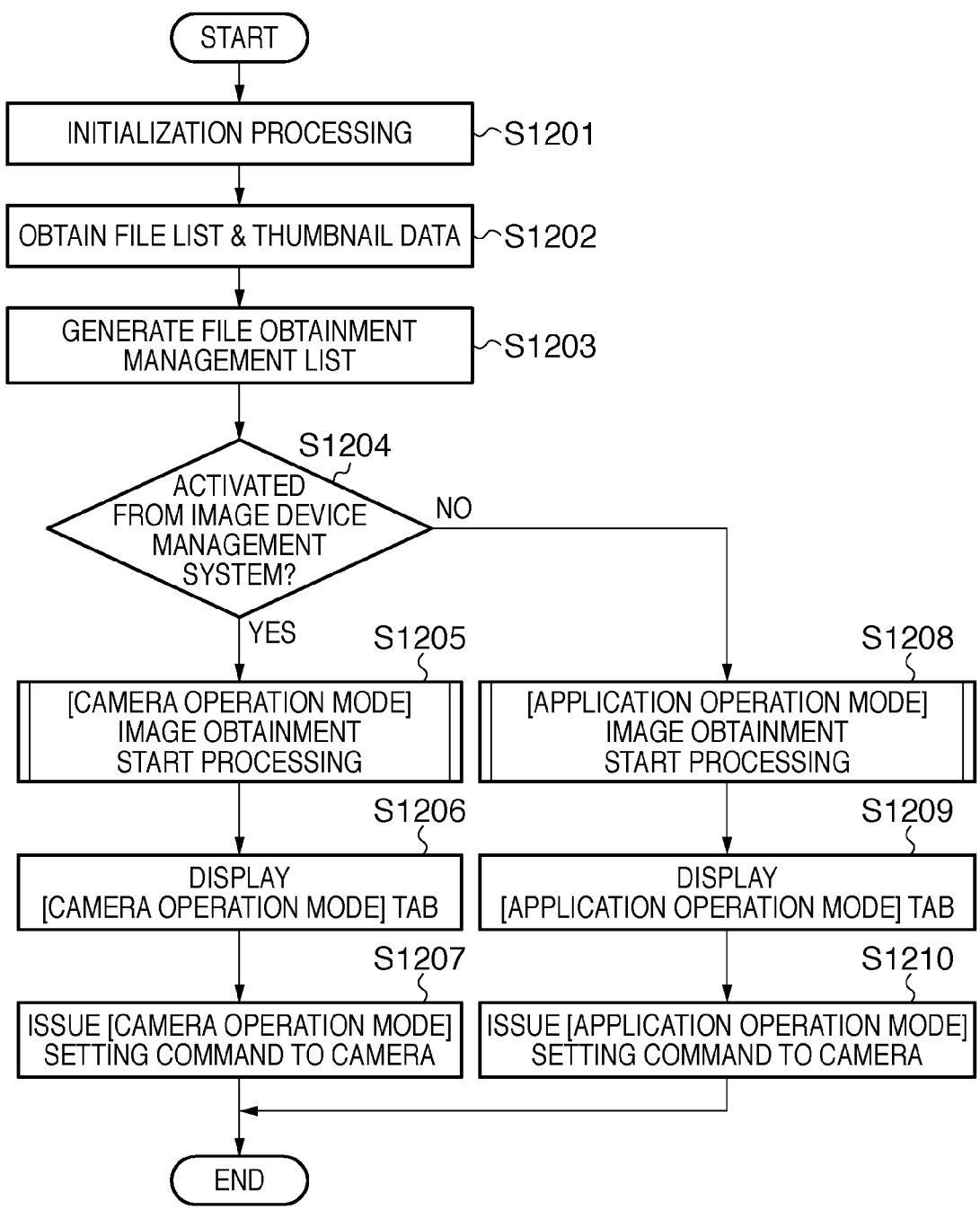
FIG. 12 is a flowchart showing the operation of the application software according to the embodiment.

After the application software 310 is activated, and the initialization processing with the digital camera 20 is completed, the obtainment order manager 319 executes the processing for generating the file obtainment management list shown in step S1203 in FIG. 12. In this processing, the obtainment order manager 319 obtains information of all image files (image list 1300) stored in the memory card 608 from the digital camera 20. FIG. 13 shows the image list 1300 which conceptually expresses the obtained information. The information included in the image list 1300 includes the file names 1301 in the memory card 608, the time stamps 1302 of these files, and the archive attribute information 1303 held by the file system as attribute information.

Upon obtaining this information, the obtainment order manager 319 of the application software 310 excludes files including the archive attribute information 1303="yes", that is, those which have ever been obtained by the computer from the image list 1300. As a result, in the image list 1300, information of each file to be obtained by the application software 310 remains. After that, elements are sorted to have the time stamps 1302 as a key to be arranged in ascending order of date and time from the top to bottom of the table. Note that the sorting order of elements based on the dates and times relates to the display order of reduced images on the reduced image display area by the application software 310, that is, that older reduced images are displayed at upper positions and newer ones are displayed at lower positions.

The file obtainment management list 1400 shown in FIG. 14 is completed based on the consequently generated information by copying it or by expanding elements.

Figure 23:
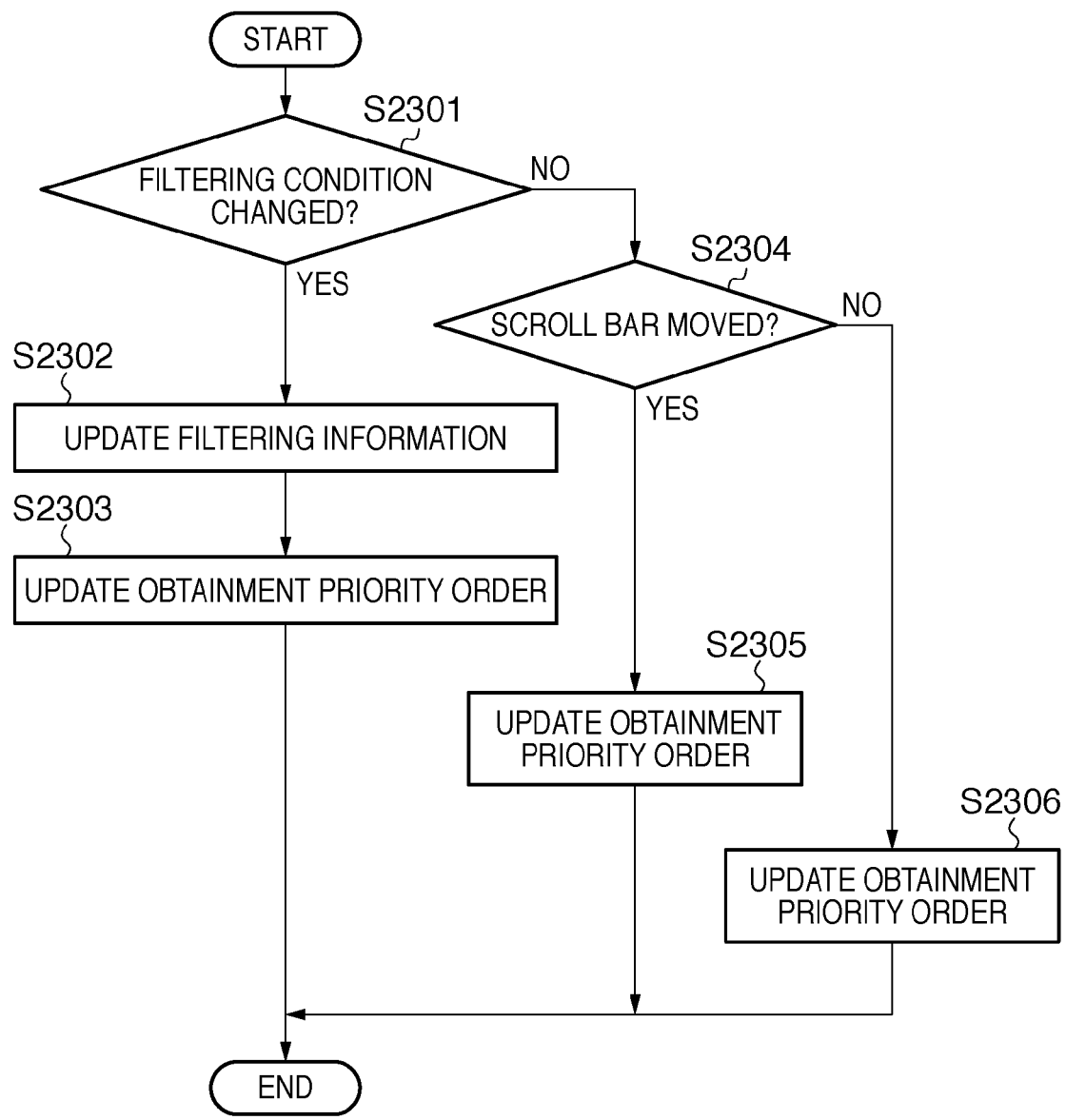
FIG. 23 is a flowchart for explaining the operation of the application software according to the embodiment, i.e., file obtainment management list updating processing.

The processing for updating the file obtainment management list 1400 in accordance with the filtering condition will be described below using the flowchart shown in FIG. 23. This processing corresponds to that (for updating the file obtainment management list) in step S1502 in FIG. 15 or step S1602 in FIG. 16.

The obtainment order manager 319 determines in step S2301 if the filtering condition is changed, and branches the processes according to the determination result. If this sequence is executed after the user has changed the filtering condition by operating the filtering condition setting menu of the digital camera 20 or the filtering condition setting menu 720 of the application software 310, the process advances to step S2302. Note that the process advances to step S2302 if this sequence is executed for the first time since activation of the application software 310, or if this sequence is executed by designating the camera operation mode tab 701 or application operation mode tab 702 (step S1703 in FIG. 17 or step S1803 in FIG. 18).

Note that a trigger which calls this sequence is passed as a parameter.

In step S2302, the value of the filtering information 1404 in the file obtainment management list 1400 is changed in correspondence with the filtering condition at that time. For example, if "display all unobtained images" is selected as the filtering setting in the application software 310 or digital camera 20, the value of the filtering information 1404 is set to be "yes" for all elements. In this case, "yes" in the application software 310 of this embodiment is to display a corresponding image on its GUI.

For example, if "display only unobtained still images" is selected as the filtering setting in the application software 310, filtering information for each still image data file is "yes", but that for each movie data file is "no". FIG. 24 shows an example of this case. The application software 310 determines a still image or movie by referring to the expansion of each file name 1401. In the example of FIG. 24, a file with an expansion "AVI" is determined as movie data, and filtering information 1404 corresponding to that file is set to be "no".

In step S2303, the obtainment order manager 319 sets the obtainment priority orders 1405. In the setting sequence, numbers are assigned to only elements including the archive attribute information="no" and the filtering information 1404="yes" in turn from the top of the file obtainment management list 1400. After the numbers are assigned to all elements, serial numbers of the obtainment priority orders are assigned to files including the archive attribute information 1403="no" and the filtering information 1404="no" in turn from the top of the list.

An example of the aforementioned result is the file obtainment management list 1400 shown in FIG. 25. FIG. 25 corresponds to a case in which "display only unobtained still images". As a result of the processing, higher priority orders are set for files with an expansion "JPG", and lower priority orders are set for other files (in the example of FIG. 25, a file with an expansion "AVI").

On the other hand, if the scroll bar 730 is operated, the process advances to step S2305 via step S2304 from step S2301.

In step S2305, only the obtainment priority orders 1405 are set again without changing the filtering information 1404 of the file obtainment management list 1400. For example, if the scroll bar 730 is operated to update the image list display area 711, the file obtainment management list 1400 is searched for an element corresponding to reduced image data displayed at the top leftmost position on the image list display area 711. Then, the obtainment priority order 1405 of that element is set to be highest. Then, the obtainment priority orders 1405 are set again in turn from elements which are listed below that element and include the filtering information 1404="yes" and the archive attribute information 1403="no". After the last element of the list is set, the obtainment priority orders 1405 are assigned again from the top of the list under the same condition. After completion of assignment of the obtainment priority orders 1405 under the above condition, the obtainment priority orders 1405 are set for elements including the filtering information 1404="no" and the archive attribute information 1403="no". After completion of assignment of the obtainment priority orders 1405 under this condition, this processing ends.

Step S2306 is executed when the user clicks a reduced image on the image list display area 711 or when he or she operates the arrow button 405 of the digital camera 20. That is, step S2306 is the processing executed when a selected reduced image indicating an image to be displayed on the main image display area 712 is switched. In this case, elements of a file corresponding to the selected reduced image, and those with the highest obtainment priority order 1405 at that time are detected, and their obtainment priority orders 1405 are exchanged, thus ending the processing.

Figure 16:
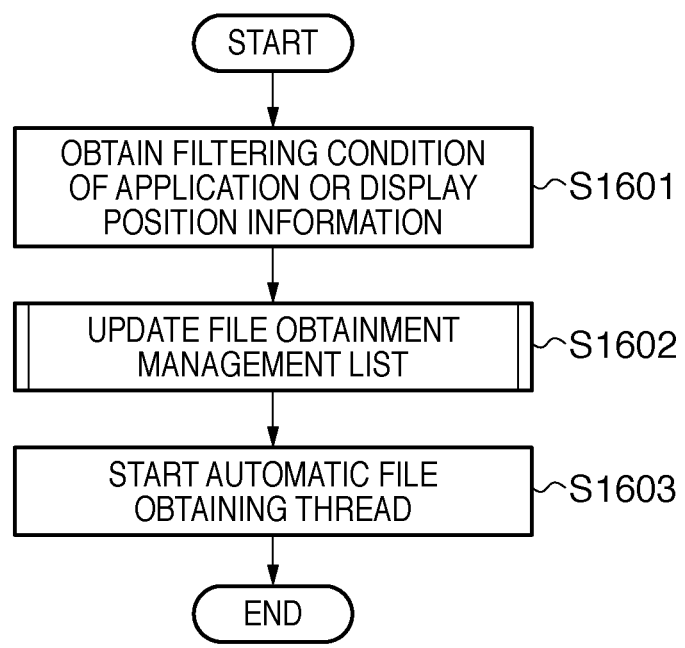
FIG. 16 is a flowchart showing the operation of the application software according to the embodiment, that is, image obtaining processing in an application operation mode.

If the file obtainment management list 1400 is updated, as shown in FIG. 15 or 16, the automatic file obtaining thread is activated (step S1503 or S1603), the processing shown in FIG. 22 is started. Of the processes shown in FIG. 22, step S2211 includes, in association with items corresponding to the obtained file included in file obtainment management list 1400, the process for setting the archive attribute information 1403 to be "yes", that for invalidating the obtainment priority order 1405, and that for setting the path of the file generated in step S2203 in the file path 1406.

FIG. 26 shows that example. FIG. 26 shows a state after an image with the highest priority order is obtained with reference to the file obtainment management list 1400 in the state shown in FIG. 25. As can be seen from FIG. 26, archive attribute information 2601 of IMG_0002.JPG is set to be "yes", an obtainment priority order 2602 is set to be invalid "-", and a path to a file in the HDD 209 is added in a file path 2603.

FIG. 27 is a flowchart for explaining processing executed when a main image is displayed on the main image display area 712 in FIG. 7 or the main image display area 713 in FIG. 8. An instruction of an image to be displayed is selected on the image list display area 711 in case of FIG. 7 or is designated using the UI of the digital camera in case of FIG. 8.

In step S2701, the display manager 316 refers to the archive attribute information 1403 of an item corresponding to the image to be displayed from the file obtainment management list 1400. If the archive attribute information is not "yes", the display manager 316 waits for processing in step S2702 as needed, and the process then returns to step S2701. As a result, the display manager 316 waits until the archive attribute information 1403 is set to be "yes". The archive attribute information 1403="yes" means that the value is written in the file path 1406 in step S2211 in FIG. 22. Therefore, in step S2703 the display manager 316 reads out an image file from the HDD 209, and displays it on the main image display area 712 or 713.

As described above, according to this embodiment, the computer 10 executes processing for automatically backing up information in the memory card 608 of the digital camera 20. In such backup processing, the computer 10 sequentially changes the data obtainment order of data in accordance with data displayed by the application software 310 which runs on the computer 10 or their display state. That is, according to the above embodiment, the obtainment order of image data in the backup operation is changed according to a change in display condition during the backup operation. For this reason, in the browse operation during the backup operation, even when an image corresponding to a display request is not backed up yet, that image can be displayed quickly. That is, according to this embodiment, when a display request of an image is input on the monitor of the computer during the backup processing, a waiting time period until that image is displayed can be shortened. For this reason, the backup operation and stress-free image browse operation can be executed at the same time.

Note that the determination method of images which have not been transferred to the computer, the format of the file obtainment management list, and the like are not limited to those of this embodiment. For example, a UUID (Universal Serial ID) appended to each image data may be used. In this case, the computer 10 receives UUIDs of image data stored in the digital camera 20, and compares and collates them with those of image data stored in itself. The computer 10 determines UUIDs which exist on the digital camera side but do not exist on itself as non-transferred image data, and obtains them from the digital camera 20.

In this embodiment, all reduced image data corresponding to image data stored in the digital camera 20 side are obtained in advance before image data are obtained. However, not all reduced image data need to be obtained. For example, when the display condition is changed during obtainment of reduced image data, reduced image data which match the display condition may be obtained first, and image data that match the display condition may then be obtained.

According to the present invention, desired data can be displayed quicker on the display unit in response to a data display request. Therefore, the user can browse data that he or she wants to see in a shorter waiting time period.

Note that the present invention includes a case wherein the functions of the embodiments are achieved by directly or remotely supplying a software program to a system or apparatus, and reading out and executing the supplied program code by a computer of that system or apparatus. The program to be supplied in this case is that corresponding to each illustrated flowchart in the embodiments.

Therefore, the program code itself installed in a computer to implement the functional processing of the present invention using the computer implements the present invention. Put differently, the present invention includes the computer program itself for implementing the functional processing of the present invention.

In this case, the form of program is not particularly limited, and an object code, a program to be executed by an interpreter, script data to be supplied to an OS, and the like may be used as long as they have the functions of the program.

As a computer-readable storage medium for supplying the computer program, the following media can be used. For example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like can be used.

As another program supply method, the user establishes a connection to a homepage on the Internet using a browser on a client computer, and downloads the computer program of the present invention from the homepage onto a recording medium such as a hard disk. In this case, the program to be downloaded may be a compressed file including an automatic installation function. Also, the program code that forms the program of the present invention may be segmented into a plurality of files, which may be downloaded from different homepages. In other words, the present invention includes a WWW server which makes a plurality of users download a program file required to implement the functional processing of the present invention by the computer.

Also, a storage medium such as a CD-ROM, which stores the encrypted program of the present invention, may be delivered to the user. In this case, the user who has cleared a predetermined condition may be allowed to download key information used to decrypt the encrypted program from a homepage via the Internet. The user executes the encrypted program using the downloaded key information to install the program on a computer.

The functions of the aforementioned embodiments can be implemented when the computer executes the readout program. Furthermore, the functions of the aforementioned embodiments can be implemented in collaboration with an OS or the like running on the computer based on an instruction of that program. In this case, the OS or the like executes some or all of actual processes, which implement the functions of the aforementioned embodiments.

Furthermore, some or all of the functions of the aforementioned embodiments may be implemented when the program read out from the storage medium is written in a memory equipped on a function expansion board or a function expansion unit, which is inserted into or connected to the computer. In this case, after the program is written in the function expansion board or unit, a CPU equipped on the function expansion board or function expansion unit executes some or all of actual processes based on an instruction of that program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2008-011931, filed Jan. 22, 2008, which is hereby incorporated by reference herein in its entirety.

What is claimed is:

1. An information processing apparatus comprising:
a first obtaining unit which obtains, from an electronic device connected to the information processing apparatus, image data stored in a memory medium connected to the electronic device;
a second obtaining unit which obtains in advance reduced image data corresponding to the image data before obtainment of the image data by the first obtaining unit;
a determining unit which determines an obtainment order of image data for the first obtaining unit; and
a display control unit which updates reduced image data displayed on a display unit of the information processing apparatus, obtained by the second obtaining unit, in accordance with a display condition designated by a user,
wherein, when the display condition is changed while the first obtaining unit is executing obtainment of image data, the determining unit determines the obtainment order based on the changed display condition, and the first obtaining unit obtains image data stored in the memory medium, which has not been obtained yet, in accordance with the changed obtainment order determined by the determining unit.

2. The apparatus according to claim 1, wherein the second obtaining unit further obtains a list of image data to be obtained from the electronic device,
the determining unit determines the obtainment order in accordance with an obtainment order indicated in a obtainment list which is generated based on the list of image data obtained by the second obtaining unit, and
the first obtaining unit changes the obtainment order indicated in the list based on the changed display condition.

3. The apparatus according to claim 1, wherein the display control unit further displays a list of reduced images using the reduced image data on the display unit of the information processing apparatus, and
when displayed contents of the list of reduced images are updated, the determining unit changes the obtainment order so as to obtain, first, image data corresponding to reduced images included in a new list of reduced images to be displayed.

4. The apparatus according to claim 3, wherein when a reduced image is selected in the list of reduced images, the determining unit changes the obtainment order so as to obtain image data corresponding to the selected reduced image first.

5. The apparatus according to claim 1, wherein the determining unit changes the obtainment order in accordance with a change of the display condition so as to obtain image data that matches the changed display condition first.

6. The apparatus according to claim 1, wherein the change of the display condition is instructed via a user interface provided by the information processing apparatus.

7. The apparatus according to claim 1, wherein the change of the display condition is instructed via a user interface provided by the connected electronic device.

8. The apparatus according to claim 1, further comprising an instruction unit which designates one of an internal operation mode that validates an operation via a user interface provided by the information processing apparatus, and an external operation mode that validates an operation via a user interface provided by the connected electronic device,
wherein when the internal operation mode is designated, the change of the display condition is instructed via the user interface provided by the information processing apparatus, and
when the external operation mode is designated, the change of the display condition is instructed via the user interface provided by the connected electronic device.

9. The apparatus according to claim 1, wherein the display condition is a condition based on a date and time of generation of image data.

10. The apparatus according to claim 1, wherein when the determining unit changes the obtainment order during obtainment of image data by the first obtaining unit,
when image data, whose obtainment is underway, indicates a still image, the first obtaining unit stops obtainment and the determining unit changes the obtainment order after obtainment of that image data is completed, and
when image data, whose obtainment is underway, indicates a movie, the first obtaining unit immediately stops obtainment of that image data, and the determining unit changes the obtainment order.

11. An information processing method by an information processing apparatus, comprising:
a first obtaining step of obtaining, from an electronic device connected to the information processing apparatus, image data stored in a memory medium connected to the electronic device;
a second obtaining step of obtaining in advance reduced image data corresponding to the image data before obtainment of the image data in the first obtaining step;
a determining step of determining an obtainment order of image data for the first obtaining step; and
a display control step of updating reduced image data displayed on a display unit of the information processing apparatus, obtained in the second obtaining step, in accordance with a display condition designated by a user,
wherein, when the display condition is changed while obtainment of image data is executing in the first obtaining step, the determining step determines the obtainment order based on the changed display condition, and the first obtaining step obtains image data stored in the memory medium, which as not been obtained yet, in accordance with the changed obtainment order determined in the determining step.

12. A non-transitory computer-readable storage medium storing a program for making a computer execute an information processing method according to claim 11.

* * * * *